(12) United States Patent
Shiomi

(10) Patent No.: US 9,156,170 B2
(45) Date of Patent: Oct. 13, 2015

(54) ROBOT HAND, ROBOT, AND HOLDING METHOD OF HOLDING OBJECT TO BE PINCHED BY ROBOT

(71) Applicant: Seiko Epson Corporation, Tokyo (JP)

(72) Inventor: Masahiro Shiomi, Matsumoto (JP)

(73) Assignee: Seiko Epson Corporation (JP)

( * ) Notice: Subject to any disclaimer, the term of this patent is extended or adjusted under 35 U.S.C. 154(b) by 36 days.

(21) Appl. No.: 14/194,866

(22) Filed: Mar. 3, 2014

(65) Prior Publication Data

US 2014/0252789 A1    Sep. 11, 2014

(30) Foreign Application Priority Data

Mar. 5, 2013  (JP) ................. 2013-042667
Mar. 5, 2013  (JP) ................. 2013-042669

(51) Int. Cl.
*B66F 19/00*    (2006.01)
*B25J 15/00*    (2006.01)

(52) U.S. Cl.
CPC .................... *B25J 15/0028* (2013.01)

(58) Field of Classification Search
CPC ............. B25J 15/0014; B25J 15/0206; B25J 15/0033; B25J 15/0028; B25J 15/0042; B25J 15/022; B25J 15/0273; B25J 15/0416; B25J 15/08; B25J 15/0425; B25J 15/12; B25J 15/0475; B25J 15/026; B25J 7/00; B25J 15/103; B25J 9/1612; B25J 15/0009; B65G 47/90; B65B 23/08; B65B 21/12; H01L 21/68707

See application file for complete search history.

(56) References Cited

U.S. PATENT DOCUMENTS

| | | | | |
|---|---|---|---|---|
| 4,621,852 A | * | 11/1986 | Maki | 294/86.4 |
| 4,718,709 A | * | 1/1988 | Myers et al. | 294/106 |
| 6,082,080 A | * | 7/2000 | Holter et al. | 53/540 |
| 7,207,610 B1 | * | 4/2007 | Kauppila | 294/198 |
| 7,887,108 B1 | * | 2/2011 | Cawley et al. | 294/2 |
| 2013/0154294 A1 | | 6/2013 | Shiomi | |

FOREIGN PATENT DOCUMENTS

| | | |
|---|---|---|
| JP | 09-103983 | 4/1997 |
| JP | 2012-148380 A | 8/2012 |
| JP | 2013-123785 A | 6/2013 |
| JP | 2013-136107 A | 7/2013 |

* cited by examiner

*Primary Examiner* — Stephen Vu
(74) *Attorney, Agent, or Firm* — Harness, Dickey & Pierce, P.L.C.

(57) ABSTRACT

In a robot hand, holding units have bases, and a plurality of curved rod-shaped members that are installed at the bases and are rotatable around rotation axes. The plurality of curved rod-shaped members rotate from a virtual plane including a plurality of the rotation axes by a reaction force from the object to be pinched that is caused by the holding units pinching the object to be pinched, and portions of the curved rod-shaped members hold the object to be pinched.

18 Claims, 15 Drawing Sheets

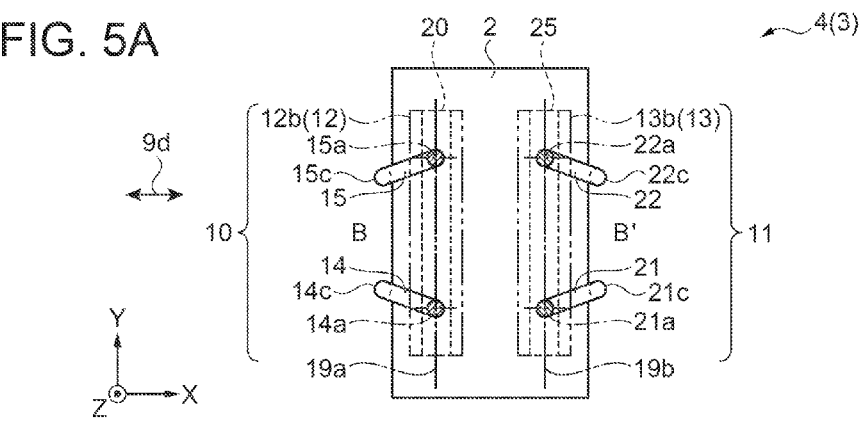
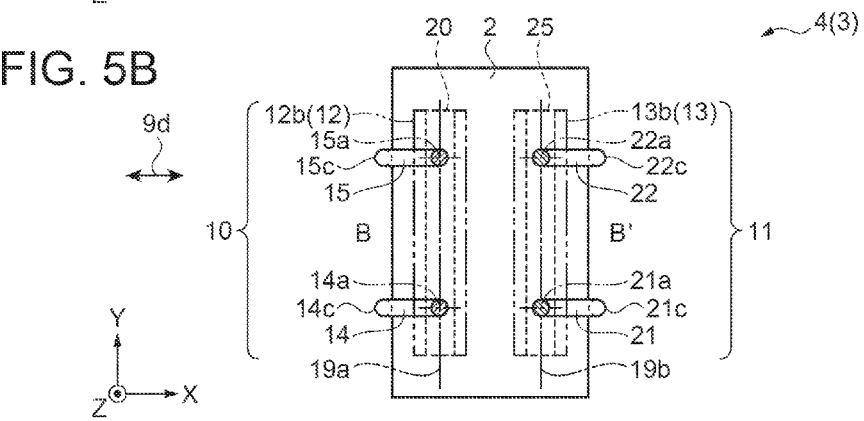
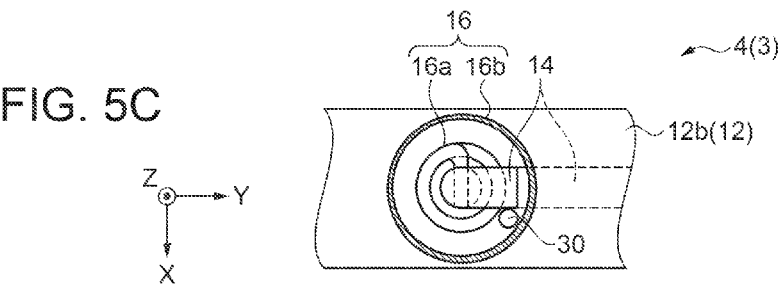
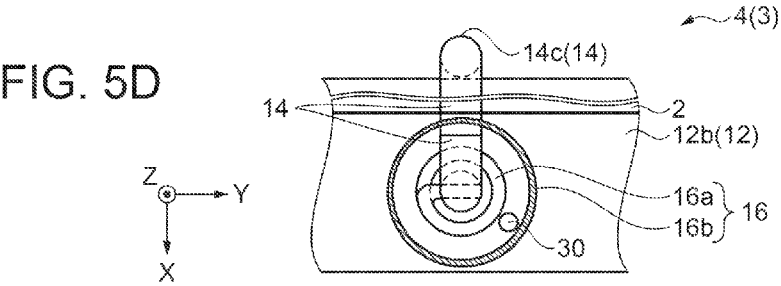

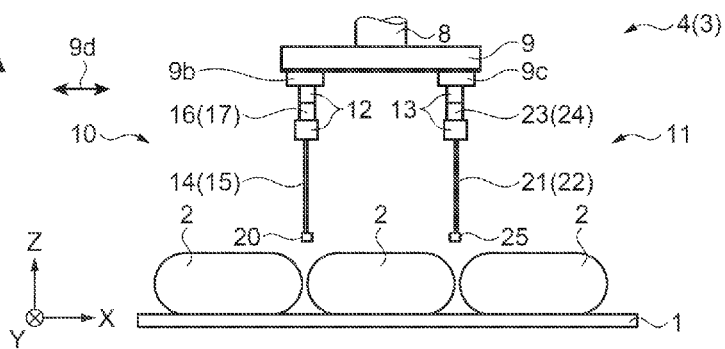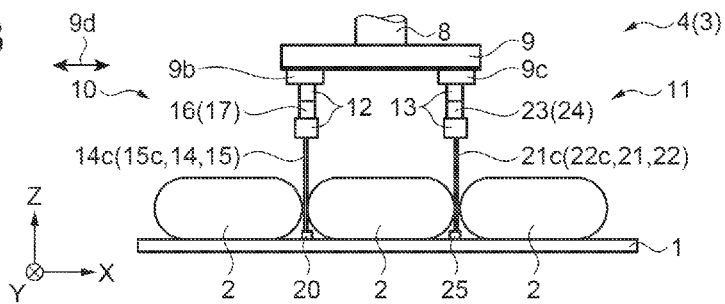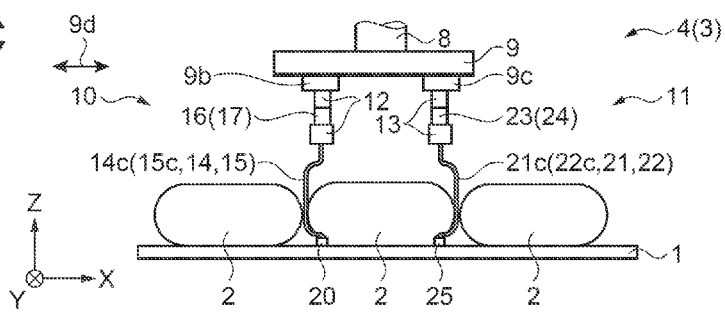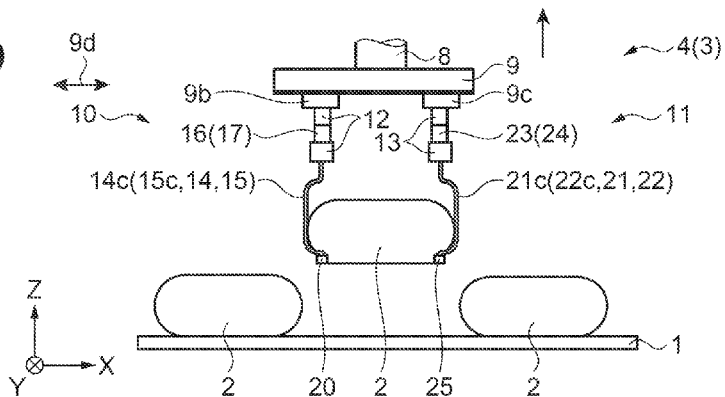

ROBOT HAND, ROBOT, AND HOLDING METHOD OF HOLDING OBJECT TO BE PINCHED BY ROBOT

BACKGROUND

1. Technical Field

The present invention relates to a robot hand, a robot, and a holding method of holding an object to be pinched by the robot.

2. Related Art

Robots that hold objects to be pinched in assembling work, sorting work, or the like are utilized. Objects to be pinched that are intended to be held by the robots are various. A robot hand capable of holding objects having various shapes or high-hardness objects and flexible objects is disclosed in JP-A-2012-148380. According to JP-A-2012-148380, the robot hand includes a pair of supports. A bag body that is filled with a gel fluid is installed on one side of each support. When the supports sandwich an object to be pinched, the bag bodies are deformed along the shape of the object to be pinched. As a result, the robot hand can stably hold the object to be pinched.

In addition, a robot hand that holds objects to be pinched that are arranged side by side is disclosed in JP-A-9-103983. The robot hand includes a pair of finger-shaped bodies. The finger-shaped bodies are formed from a tubular soft material. Fingertip portions can be expanded by supplying a fluid to the fingertip portions of the finger-shaped bodies. The fingertip portions are expanded after inserting the thin fingertip portions into the gaps between adjacent objects to be pinched. As a result, the fingertip portions are stiffened. The robot hand holds the object to be pinched with the stiffened fingertip portions.

In the robot hand of JP-A-2012-148380, the pair of supports in which the bag bodies are installed hold the object to be pinched from both sides. When objects to be pinched are installed side by side, the supports in which the bag bodies are installed cannot be inserted between adjacent objects to be pinched unless the adjacent objects to be pinched are separated from each other.

In the robot hand of JP-A-9-103983, the side surfaces of the object to be pinched are held with the stiffened fingertip portions. Since the object to be pinched is held by a frictional force when the side surfaces of the object to be pinched are pressed, the surface state, hardness, and side surface shape of the object to be pinched are easily influenced. Accordingly, it is estimated that stable holding cannot be performed. Thus, a robot that stably holds an object to be pinched even when the gap between adjacent objects to be pinched is narrow is desired.

SUMMARY

An advantage of some aspects of the invention is to provide a robot that stably holds an object to be pinched even when the gap between adjacent objects to be pinched is narrow, and the invention can be implemented as the following forms or application examples.

Application Example 1

This application example is directed to a robot hand that pinches and holds an object to be pinched with a holding unit. The holding unit includes a base, and a plurality of curved rod-shaped members that are installed at the base and rotatable around a rotation axis. The plurality of curved rod-shaped members rotate from a virtual plane including a plurality of the rotation axes by a reaction force from the object to be pinched that is caused by the holding unit pinching the object to be pinched, and portions of the curved rod-shaped members hold the object to be pinched.

According to this application example, the robot hand includes a plurality of the holding units. The holding units pinch the object to be pinched. The plurality of curved rod-shaped members are installed at each holding unit, and each curved rod-shaped member rotates from the virtual plane around the rotation axis.

Each holding unit is made to approach the object to be pinched. Also, the object to be pinched comes into contact with the curved rod-shaped members, and the object to be pinched pushes the curved rod-shaped members. The curved rod-shaped members rotate around the rotation axes and the curved rod-shaped members move to the opposite side of the object to be pinched with respect to the rotation axes. Also, the object to be pinched is pinched by the curved rod-shaped members. Portions of the curved rod-shaped members are located near the bottom of the object to be pinched. As a result, the robot hand can support the bottom and side surfaces of the object to be pinched and stably hold the object to be pinched.

The curved rod-shaped members rotate from the virtual plane. Since the plurality of curved rod-shaped members follow the virtual plane when external forces do not act upon them, the curved rod-shaped members have a thin form. Accordingly, even when the gaps between the adjacent objects to be pinched are narrow, the holding units can be inserted into the narrow gaps. Also, as the position changing unit changes the positions of the holding units, external forces act on the plurality of curved rod-shaped members. By virtue of the external forces, the curved rod-shaped members can rotate and the robot hand can hold the object to be pinched. As a result, even when the gaps between the adjacent objects to be pinched are narrow, the robot hand can stably hold the object to be pinched.

Application Example 2

This application example is directed to a robot hand that pinches and holds an object to be pinched with a holding unit. The holding unit includes a base, a plurality of curved rod-shaped members that are installed at the base and rotatable around a rotation axis, and rod-shaped tip portions installed at tips of the plurality of curved rod-shaped members. The plurality of curved rod-shaped members rotate from a virtual plane including a plurality of the rotation axes by a reaction force from the object to be pinched that is caused by the holding unit pinching the object to be pinched, and portions of the tip portions or the curved rod-shaped members hold the object to be pinched.

According to this application example, the robot hand includes a plurality of the holding units. The holding units are movable and hold the object to be pinched. The plurality of curved rod-shaped members are installed at each holding unit, and each curved rod-shaped member rotates around the rotation axis. Each curved rod-shaped member supports the tip portion.

Each holding unit is made to approach the object to be pinched. Also, the object to be pinched comes into contact with the curved rod-shaped members, and the object to be pinched pushes the curved rod-shaped members. The curved rod-shaped members rotate around the rotation axes and the curved rod-shaped members move to the opposite side of the object to be pinched with respect to the rotation axes. As a result, the tip portions enter a deep side near the bottom of the object to be pinched from the rotation axes. The tip portions are located near the bottom of the object to be pinched, and the curved rod-shaped members come into contact with the side surfaces of the object to be pinched. As a result, the robot hand can support the bottom and side surfaces of the object to be pinched and stably hold the object to be pinched.

The curved rod-shaped members rotate from the virtual plane. Since the plurality of curved rod-shaped members follow the virtual plane when external forces do not act, the curved rod-shaped members and the tip portions have thin forms. Accordingly, even when the gaps between the adjacent objects to be pinched are narrow, the holding units can be inserted into the narrow gaps. Also, as the position changing unit changes the positions of the holding units, external forces act on the plurality of curved rod-shaped members. By virtue of the external forces, the curved rod-shaped members can rotate and the robot hand can hold the object to be pinched. As a result, even when the gaps between the adjacent objects to be pinched are narrow, the robot hand can stably hold the object to be pinched.

Application Example 3

This application example is directed to the robot hand according to the application example described above, wherein the rotation axes intersect the bases of the holding units and the tip portions.

According to this application example, each holding unit includes the base. The rotation axes intersect the bases of the holding units and the tip portions. Accordingly, when the curved rod-shaped members rotate, the tip portions reliably enter below the object to be pinched. As a result, the holding units can come into contact with and hold the bottom of the object to be pinched.

Application Example 4

This application example is directed to the robot hand according to the application example described above, wherein the robot hand further includes a first film-like member that is fixed to the bases and the tip portions and a portion of the first film-like member is located between the object to be pinched and the curved rod-shaped members.

According to this application example, each curved rod-shaped member connects the base and the tip portion, and the first film-like member is installed between the base and the tip portion. The first film-like member is located between the object to be pinched and the curved rod-shaped members. Each holding unit is made to approach the object to be pinched. Also, the first film-like member comes into contact with the object to be pinched, and the object to be pinched pushes the curved rod-shaped members via the first film-like member. The curved rod-shaped members rotate around the rotation axes and a place where the curved rod-shaped members are pushed moves to the opposite side of the object to be pinched with respect to the rotation axes. As a result, the object to be pinched enters between the base and the tip portions. The tip portions are located under the object to be pinched, and the first film-like member comes into contact with the object to be pinched from the bottom of the object to be pinched to side surfaces thereof. As a result, the robot hand can support the bottom and side surfaces of the object to be pinched and stably hold the object to be pinched.

When the holding units do not come into contact with the object to be pinched, the curved rod-shaped members follow (substantially align with) the virtual plane. As a result, since the tip portions and the first film-like member, which are supported by the curved rod-shaped members, follow the virtual plane similar to the curved rod-shaped members, the curved rod-shaped members, the tip portions, and the first film-like member have thin forms. Accordingly, even when the gaps between the adjacent objects to be pinched are narrow, the holding units can be inserted into the narrow gaps.

Application Example 5

This application example is directed to the robot hand according to the application example described above, wherein the rotation axes intersect the bases of the holding units and bending portions of the curved rod-shaped members.

According to this application example, each holding unit includes the base. The rotation axes intersect the bases of the holding units and the bending portions of the curved rod-shaped members. Accordingly, when the curved rod-shaped members rotate, the tips of the curved rod-shaped members reliably enter below the object to be pinched. As a result, the holding units can come into contact with and hold the bottom of the object to be pinched.

Application Example 6

This application example is directed to the robot hand according to the application example described above, wherein the rotation axes have a virtual shape corresponding to a bowstring and the curved rod-shaped members are formed in a bow shape.

According to this application example, the curved rod-shaped members have a bow shape. The rotation axes have a virtual shape corresponding to a bowstring with respect to the bow shape of the curved rod-shaped members. Accordingly, when the object to be pinched is held, curved portions of the curved rod-shaped members can widely support the object to be pinched. Also, since a force supporting the object to be pinched can be more easily dispersed than shapes other than the bow shape, the object to be pinched can be made hard to deform by the curved rod-shaped members even when the object to be pinched is soft.

Application Example 7

This application example is directed to the robot hand according to the application example described above, wherein the holding units include biasing portions that bias the curved rod-shaped members so that the curved rod-shaped members follow a virtual plane including the plurality of rotation axes.

According to this application example, the biasing portions are biased so that the curved rod-shaped members follow the virtual plane. Since the plurality of curved rod-shaped members and tip portions follow the virtual plane by biasing forces by the biasing portions when external forces do not act thereupon, the curved rod-shaped members and the tip portions have thin forms. Accordingly, even when the gaps between the adjacent objects to be pinched are narrow, the holding units can be inserted into the narrow gaps.

Application Example 8

This application example is directed to the robot hand according to the application example described above, wherein the plurality of curved rod-shaped members intersect each other when the plurality of curved rod-shaped members follow a virtual plane including the plurality of rotation axes.

According to this application example, when the plurality of curved rod-shaped members follow the virtual plane, the plurality of curved rod-shaped members intersect each other. An intersecting place is a place between the rotation axes of the respective curved rod-shaped members. Accordingly, the width between the curved rod-shaped members can be narrowed in a direction orthogonal to the rotation axes on the virtual plane.

Application Example 9

This application example is directed to the robot hand according to the application example described above, wherein joint portions bendably couple the curved rod-shaped members and the tip portions, and the curved rod-shaped members and the tip portions rotate around two axes that intersect each other via the joint portions.

According to this application example, the joint portions are arranged between the curved rod-shaped members and the tip portions. The joint portions rotate around the two intersecting axes. The direction in which the tips of the curved rod-shaped members extend, and the axial direction of the rotation axes intersect each other. When the curved rod-shaped members rotate around the rotation axes, the direction to which the tips of the curved rod-shaped members are directed changes. The tip portions are located in the direction in which the tips of the curved rod-shaped members extend. When the direction to which the tips of the curved rod-shaped members are directed changes, the two axes rotate at the joint portions. Accordingly, the curved rod-shaped members can be rotated so that the tip portions are not twisted.

Application Example 10

This application example is directed to the robot hand according to the application example described above, wherein the tip portions have a trapezoidal shape when viewed from a longitudinal direction, and tip sides of the tip portions have an acute angle, and the tip portions are attachable to and detachable from the curved rod-shaped members.

According to this application example, the tip portions easily enter the deep side near the bottom of the object to be pinched. Additionally, replacement of the tip portions becomes easy.

Application Example 11

This application example is directed to a robot that includes the robot hand according to any one of the application examples described above; a wrist joint portion connected to the robot hand; a link connected to the wrist joint portion; a main body portion; and a shoulder joint portion coupled to the body portion and the link.

According to this application example, the robot has the main body portion, and the shoulder joint portion is installed at the main body portion. The link is connected to the shoulder joint portion, and the wrist joint portion is installed at the link. The robot hand that holds the object to be pinched is connected to the wrist joint portion. When the holding units of the robot hand do not come into contact with the object to be pinched, the curved rod-shaped members follow the virtual plane. As a result, since the curved rod-shaped members follow the plane, a place occupied by the curved rod-shaped members has a thin form. Accordingly, even when the gaps between the adjacent objects to be pinched are narrow, the holding units can be inserted into the narrow gaps. Also, when the position changing unit makes the positions of the holding units approach the object to be pinched, the robot hand can stably hold the object to be pinched. As a result, the robot can be a robot including a robot hand that stably holds the object to be pinched even when the gap between the adjacent objects to be pinched is narrow.

Application Example 12

This application example is directed to a robot hand that pinches and holds an object to be pinched. The robot hand includes a holding unit that holds the object to be pinched; a position changing unit that changes the position of the holding unit; and a plurality of curved rod-shaped members that are installed at the holding unit and are rotatable around a rotation axis. The position changing unit narrows the interval between a plurality of the holding units and thereby the plurality of holding units pinch the object to be pinched. The plurality of curved rod-shaped members rotate from a virtual plane including a plurality of the rotation axes, and portions of the curved rod-shaped members hold the object to be pinched so as to follow the surfaces of the object to be pinched.

According to this application example, the robot hand includes the plurality of the holding units. The position changing unit moves the holding units and changes the relative position of the plurality of holding units. Also, the holding units hold the object to be pinched. The plurality of curved rod-shaped members are installed at each holding unit, and each curved rod-shaped member rotates from the virtual plane around the rotation axis.

The position changing unit makes each holding unit approach the object to be pinched. Also, the object to be pinched comes into contact with the curved rod-shaped members, and the object to be pinched pushes the curved rod-shaped members. The curved rod-shaped members rotate around the rotation axes and the curved rod-shaped members move to the opposite side of the object to be pinched with respect to the rotation axes. Also, the object to be pinched is pinched by the curved rod-shaped members. As a result, the robot hand can support the side surfaces of the object to be pinched and stably hold the object to be pinched.

The curved rod-shaped members rotate from the virtual plane. Since the plurality of curved rod-shaped members follow the virtual plane when external forces do not act, the curved rod-shaped members have a thin form. Accordingly, even when the gaps between the adjacent objects to be pinched are narrow, the holding units can be inserted into the narrow gaps. Also, as the position changing unit changes the positions of the holding units, external forces act on the plurality of curved rod-shaped members. By virtue of the external forces, the curved rod-shaped members rotate and the robot hand can hold the object to be pinched. As a result, even when the gaps between the adjacent objects to be pinched are narrow, the robot hand can stably hold the object to be pinched.

Application Example 13

This application example is directed to a holding method of holding an object to be pinched with a robot. In the holding method, a robot hand pinches and holds the object to be pinched. The holding method includes a first robot hand moving step of installing a plurality of curved rod-shaped members, which are rotatable around a rotation axis, at a virtual plane including a plurality of rotation axes, and of moving the robot hand so that the object to be pinched is located between a plurality of holding units; a holding starting step of narrowing the relative distance between the plurality of holding units with a position changing unit to bring the curved rod-shaped members into contact with the object to be pinched to rotate the curved rod-shaped members by a reaction force from the object to be pinched to hold and support the object to be pinched with the curved rod-shaped members; a second robot hand moving step of moving the robot hand while holding the object to be pinched; and a holding terminating step of moving the holding units with the position changing unit to extend the distance between the holding units to space the curved rod-shaped members and the object to be pinched apart from each other to terminate the holding of the object to be pinched.

According to this application example, in the first robot hand moving step, the robot hand is moved so that the object to be pinched is located between the plurality of holding units. In the holding starting step, the position changing unit moves the holding units. Also, the position changing unit brings the curved rod-shaped members into contact with the object to be pinched, and rotates the curved rod-shaped members by a reaction force from the object to be pinched. As a result, the curved rod-shaped members support and hold the object to be pinched. In the second robot hand moving step, the robot hand is moved while holding the object to be pinched. In the holding terminating step, the position changing unit moves the holding units to extend the distance between the holding units. As a result, the position changing unit spaces the curved rod-shaped members and the object to be pinched apart from each other, and terminates the holding of the object to be pinched.

In the first robot hand moving step, the thickness of the holding units is narrowed by making the plurality of curved rod-shaped members follow the virtual plane. Accordingly, even when the gaps between the adjacent objects to be pinched are narrow, the robot hand can be moved between the objects to be pinched. Also, in the holding starting step, the curved rod-shaped members are brought into contact with the objective to be pinched and support and hold the object to be pinched. Accordingly, the robot hand can stably hold the object to be pinched. As a result, even when the gaps between the adjacent objects to be pinched are narrow, the robot hand can stably hold the object to be pinched.

Other Application Examples

Another application example relates to robot hand that pinches and holds an object, the holding unit including a support and a holding unit coupled to the support. The holding unit includes: a base, and a plurality of non-linear rods rotatably mounted to the base so as to be rotatable around a rotation axis. The plurality of rods rotate from a first state that has an entirety of each rod being substantially aligned within a plane including a plurality of the rotation axes to a second state that has a part of each rod shifted from the plane by a reaction force imparted from the object due to the holding unit pinching the object. The rods hold the object along a contact interface of the rods and the object.

If desired, tips may be mounted to distal ends of the plurality of rods and the tips or the rods hold the object along a contact interface of the tips or rods and the object.

The tips may continuously intersect the rotation axes while the rods rotate between the first and second states.

Also if desired, a first film may be fixed to the base and the tip portions, and a portion of the first film may be located between the object and the rods.

Each rod may include: a proximal end mounted to the base, a distal end at the opposite end of the rod as the proximal end, and a protruding portion between the proximal end and the distal end. The protruding portion is radially spaced apart from the proximal and distal ends. The protruding portions continuously intersect the rotation axes while the rods rotate between the first and second states.

If desired, the rods may be U-shaped.

The holding units may include biasing members that bias the rods into substantial alignment within the plane.

If desired, the plurality of rods may overlap each other when in substantial alignment within the plane.

The support may further comprise a position changing unit movably supporting a plurality of the holding units. The position changing unit narrows an interval between the holding units so that the holding units pinch the object. That is, the plurality of rods rotate from the plane, and portions of the rods hold the object while following surfaces of the object.

Another application example relates to a holding method of holding an object with a robot hand of a robot includes: a first step of moving the robot hand so that the object is located between a plurality of holding units, each holding unit including a plurality of non-linear members which are rotatable out of substantial alignment within a plane including a plurality of rotation axes of the non-linear members; a second step of narrowing a relative distance between the plurality of holding units to bring the members into contact with the object and to rotate the members by a reaction force imparted from the object to the members so that the members support the object; a third step of moving the robot hand while holding the object; and a fourth step of moving the holding units to extend the relative distance between the holding units to separate the members and the object from each other to terminate the holding of the object.

BRIEF DESCRIPTION OF THE DRAWINGS

Embodiments of the invention will be described with reference to the accompanying drawings, wherein like numbers reference like elements.

FIGS. 5A to 5D are schematic views for describing the operation of the first rod to the fourth rod.

FIGS. 7A to 7D are schematic views for describing the movement method of the object to be pinched.

FIG. 9A is a schematic side view showing the structure of a robot hand, and FIGS. 9B and 9C are schematic cross-sectional views of portions showing the structure of tip portions.

FIG. 11A is a schematic side view showing the structure of a robot hand, and FIGS. 11B and 11C are schematic views for describing the operation of the robot hand.

FIG. 12A is a schematic side view showing the structure of a robot hand, and FIG. 12B is a schematic side view showing the structure of a robot hand in a comparative example.

FIG. 13A is a schematic side cross-sectional view showing the structure of a robot hand, and FIG. 13B is a schematic cross-sectional view of portions showing the structure of holding units.

FIG. 14A is a schematic perspective view showing the configuration of a robot hand, and FIG. 14B is a schematic side cross-sectional view showing the configuration of the robot hand.

DESCRIPTION OF EXEMPLARY EMBODIMENTS

First Embodiment

Figure 1A:
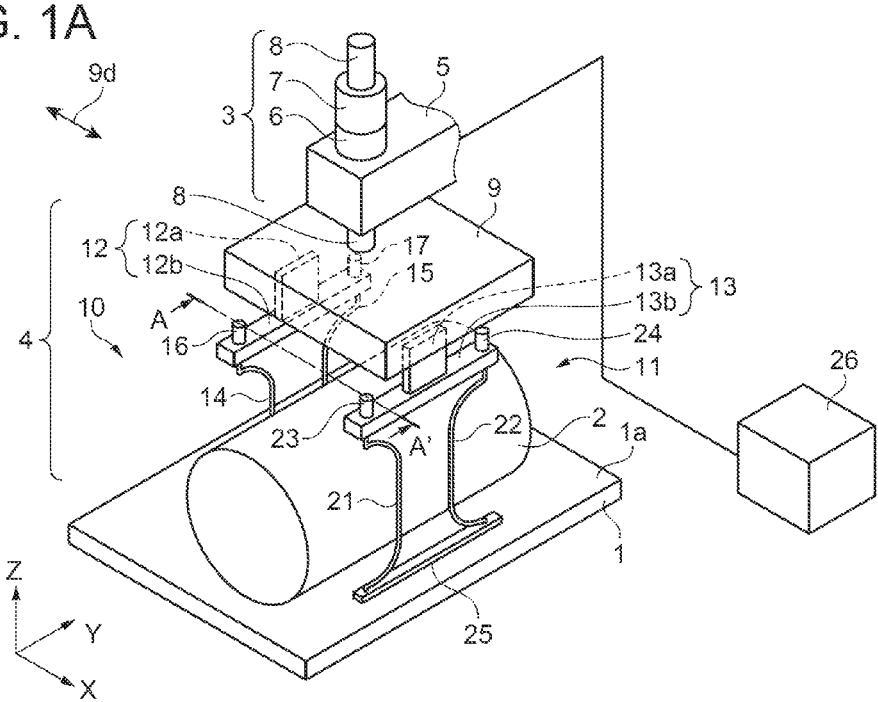
FIGS. 1A and 1B are schematic perspective views showing the configuration of a robot hand related to a first embodiment.
Figure 1B:
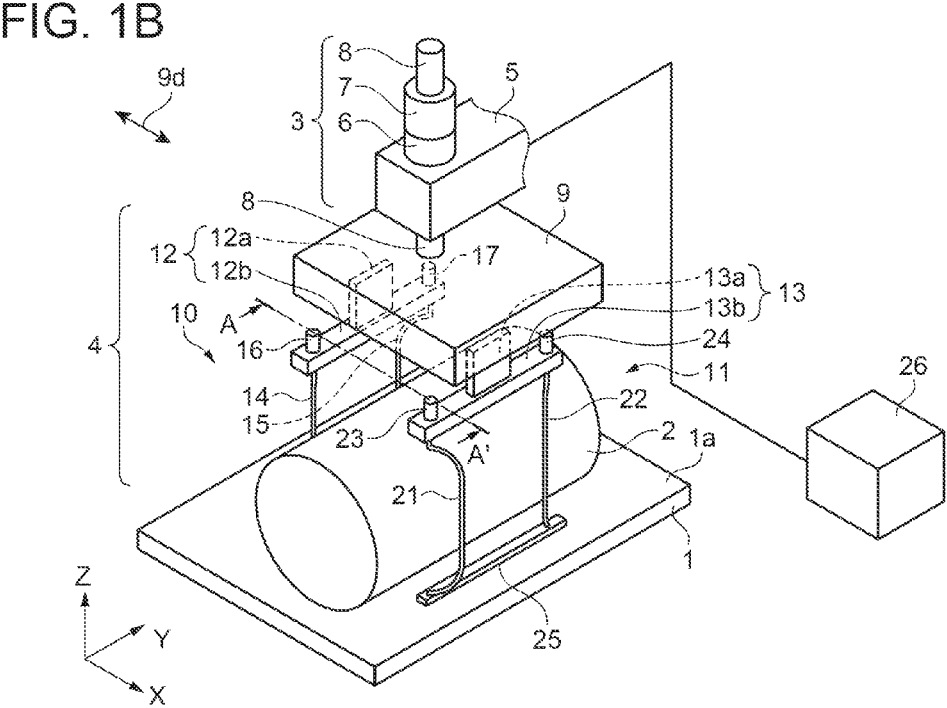
Figure 2A:
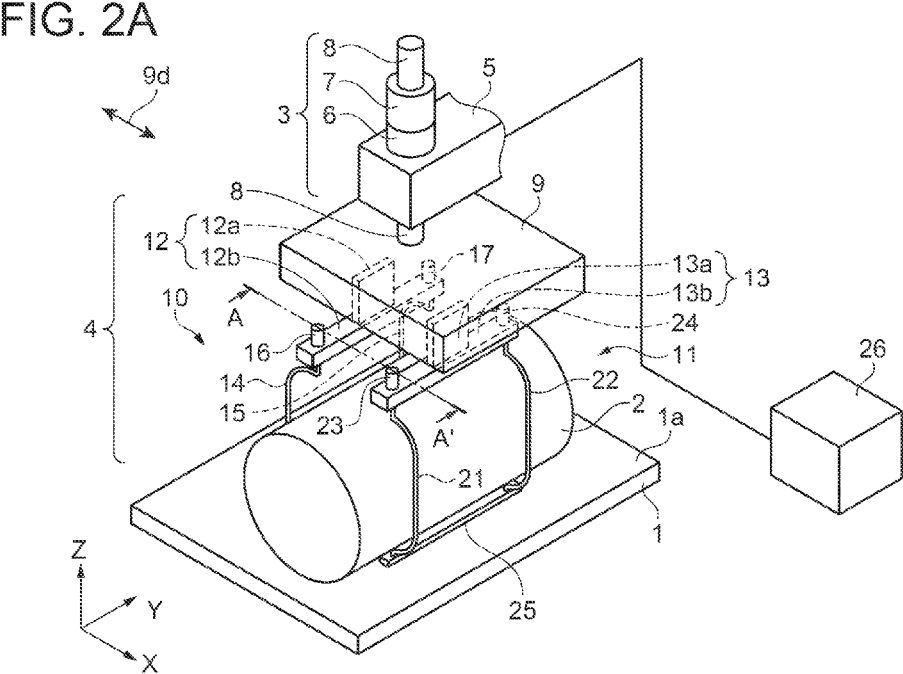
FIG. 2A is a schematic perspective view showing the configuration of the robot hand.
Figure 2B:
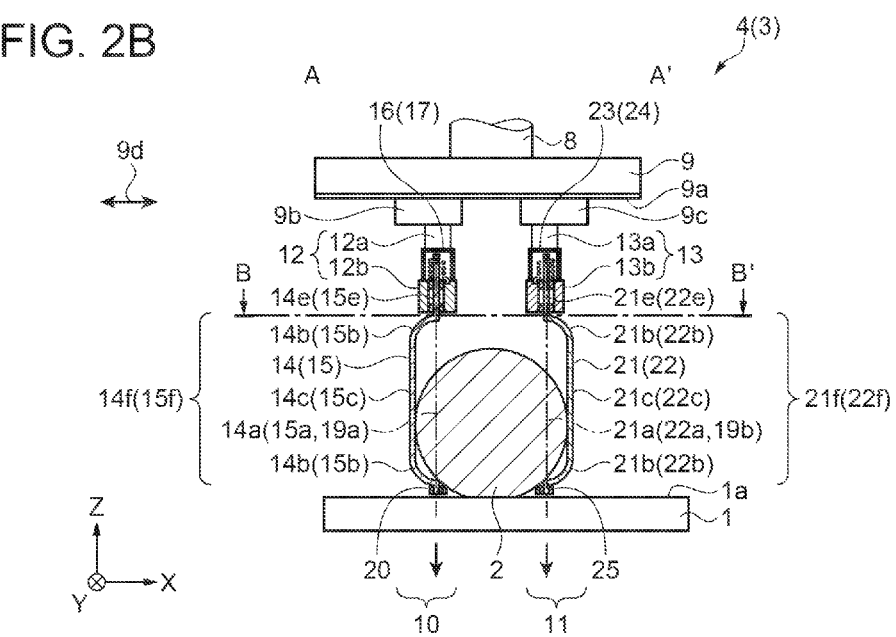
FIG. 2B is a schematic side cross-sectional view showing the configuration of the robot hand.

In the present embodiment, a characteristic robot hand, and an example in which an object to be pinched is held using this robot hand will be described according to FIGS. 1A to 8D. FIGS. 1A to 2A are schematic perspective views showing the configuration of the robot hand. FIG. 1A shows a state immediately before the robot hand holds the object to be pinched, and FIG. 1B shows a state where the robot hand comes into contact with the object to be pinched. FIG. 2A shows a state where the robot hand holds the object to be pinched. FIG. 2B is a schematic side cross-sectional view showing the configuration of the robot hand. FIG. 2B is a schematic cross-sectional view along line A-A' of FIG. 2A. In addition, in respective views used for the following description, the scales are made different for respective members in order to make the respective members have recognizable sizes on the drawings.

As shown in FIGS. 1A to 2B, an object 2 to be pinched is placed on a quadrangular plate-shaped placing table 1. The surface of the placing table 1 that is directed upward in the drawing is a plane 1a. The direction of a normal line of the plane 1a is a direction opposite to a direction in which gravitational acceleration acts, and this direction is referred to as a Z direction. Also, directions along the plane 1a are defined as an X direction and a Y direction, and the X direction, the Y direction, and the Z direction are orthogonal directions, respectively.

The object 2 to be pinched has only to be an object that is not particularly easily deformed, and is not particularly limited. The object to be pinched may be a flexible object. The object 2 to be pinched is, for example, an object, such as ham, sausage, cheese, cream croquette, konnyaku, bean curd, or agar. Although one object 2 to be pinched is placed on the placing table 1 in order to make the drawing easily seen, a plurality of objects 2 to be pinched may be arranged and installed in proximity to each other on the placing table 1. Although the object 2 to be pinched has a column shape in the drawing, the shape thereof is not particularly limited to the column.

A robot hand 4 installed at the robot 3 is located in the Z direction of the object 2 to be pinched. The robot 3 includes an arm 5 that extends in the Y direction, and a plurality of arms and joints (not shown) that are connected to the arm 5. Also, the robot 3 is adapted to be capable of moving the arm 5 by rotating these joints.

An elevating mechanism 6 and a rotating mechanism 7 are installed at the tip of the arm 5. The elevating mechanism 6 and the rotating mechanism 7 rotate an elevating/rotating shaft 8 and reciprocate the elevating/rotating shaft 8 in the Z direction. The structure of the elevating mechanism 6 and the rotating mechanism 7 is not particularly limited. A motor and a ball screw, a linear motor, a rack and pinion, or the like can be used as the elevating mechanism 6. For example, in the present embodiment, the elevating mechanism 6 has a structure in which a motor and a ball screw are combined, and the ball screw makes the elevating/rotating shaft 8 perform a linear motion. The rotating mechanism 7 has a structure in which a motor and a speed reduction gear are combined, and the speed reduction gear rotates the elevating/rotating shaft 8.

The robot hand 4 is installed at the end of the elevating/rotating shaft 8 in a −Z direction. The robot hand includes a position changing unit 9 connected to the elevating/rotating shaft 8. The position changing unit 9 has a substantially rectangular parallelepiped shape. A pair of rails 9a that extend in the X direction are installed on the surface of the position changing unit 9 on a −Z-direction side. A first stage 9b and a second stage 9c are installed at the rails 9a so as to hang therefrom. The first stage 9b and the second stage 9c move in the ±X directions along the rails 9a. The ±X directions in which the first stage 9b and the second stage 9c move are defined as position change directions 9d.

The position changing unit 9 has a linear motion mechanism, and the linear motion mechanism reciprocates the first stage 9b and the second stage 9c in the position change directions 9d. The position changing unit 9 can respectively independently move the first stage 9b and the second stage 9c. The structure of the linear motion mechanism included in the position changing unit 9 is not particularly limited, and the same mechanism as the elevating mechanism 6 can be used. In the present embodiment, for example, this linear motion mechanism is configured by combining a step motor and a ball screw.

A first holding unit 10 as a holding unit that is connected to the first stage 9b is installed on the −Z-direction side of the first stage 9b. A second holding unit 11 as a holding unit that is connected to the second stage 9c is installed on the −Z-direction side of the second stage 9c. The position changing unit 9 has the function of moving the first stage 9b and the second stage 9c to thereby change the relative position of the first holding unit 10 and the second holding unit 11. In addition, a method based on a position control using a preset template, a method based on a grip pressure control of performing gripping while monitoring grip pressure with a pressure sensor, or the like can be used for the control of this relative position.

The first holding unit 10 includes a first base 12 as a base that is connected to the position changing unit 9, and the position changing unit 9 moves the first base 12. The first base 12 has a shape such that a rectangular parallelepiped-shaped horizontal member 12b that extends in the Y direction is connected to one end of a bar-shaped vertical member 12a that extends in the Z direction in the middle thereof. Similarly, the second holding unit 11 also includes a second base 13 as a base that is connected to the position changing unit 9, and the position changing unit 9 moves the second base 13. The second base 13 has a shape such that a rectangular parallelepiped-shaped horizontal member 13b that extends in the Y direction is connected to one end of a bar-shaped vertical member 13a that extends in the Z direction in the middle thereof. The vertical member 12a is fixed to the first stage 9b, and the vertical member 13a is fixed to the second stage 9c. Also, the interval between the vertical member 12a and the vertical member 13a is changed by the position changing unit 9.

A first rod 14 as a curved rod-shaped member and a second rod 15 as a curved rod-shaped member that extend in the −Z direction are installed on the −Z-direction side of the horizontal member 12b. The first rod 14 is rotatably installed with a rotation axis 14a along the Z direction as a rotation center. Similarly, the second rod 15 is also rotatably installed with a rotation axis 15a along the Z direction as a rotation center. The curved rod-shaped members may also be referred to herein as being non-linear and/or being generally U-shaped. The rotation axis 14a and the rotation axis 15a are orthogonal to the position change directions 9d. Accordingly, a virtual plane 19a including the rotation axis 14a and the rotation axis 15a is orthogonal to the position change directions 9d. On the Z-direction side of the horizontal member 12b, a first biasing portion 16 as a biasing portion is installed in a place that faces the first rod 14, and a second biasing portion 17 as a biasing portion is installed in a place that faces the second rod 15.

The first biasing portion 16 is connected to the first rod 14 and generates a torque according to an angle at which the first rod 14 rotates. Similarly, the second biasing portion 17 is connected to the second rod 15 and generates a torque according to an angle at which the second rod 15 rotates. The first rod 14 and the second rod 15 are biased in predetermined rotational directions by the first biasing portion 16 and the second biasing portion 17.

The first rod 14 is a round bar that has two circular-arc portions 14b and has a shape that is curved in the shape of a bow or substantially in the shape of a bow. Both ends of the first rod 14 are made linear and are arranged along the rotation axis 14a. The rotation axis 14a has a virtual shape corresponding to a bowstring with respect to the bow shape of the first rod 14. A portion between the two circular-arc portions 14b is a place farthest from the rotation axis 14a, and this portion is referred to as a protruding portion 14c. Similarly, the second rod 15 has two circular-arc portions 15b and has a shape that is curved in the shape of a bow or substantially in the shape of a bow. Both ends of the second rod 15 are made linear and are arranged along the rotation axis 15a. The rotation axis 15a has a virtual shape corresponding to a bowstring with respect to the bow shape of the second rod 15. A portion between the two circular-arc portions 15b is a place farthest from the rotation axis 15a, and this portion is referred to as a protruding portion 15c.

A first tip portion 20 as a tip portion is installed at the ends of the first rod 14 and the second rod 15 on the −Z-direction side. The first rod 14 and the second rod 15 are rotatably installed with respect to the first tip portion 20. The first rod 14 is rotatably supported on the horizontal member 12b and the first tip portion 20. Similarly, the second rod 15 is rotatably supported on the horizontal member 12b and the first tip portion 20. The horizontal member 12b, the first tip portion 20, the rotation axis 14a, and the rotation axis 15a are formed in an oblong shape. Accordingly, even if the first rod 14 rotates around the rotation axis 14a and the second rod 15 rotates around the rotation axis 15a, the relative position of the horizontal member 12b and the first tip portion 20 does not change.

The second holding unit 11 includes the same shape as the first holding unit 10. A third rod 21 as a curved rod-shaped member and a fourth rod 22 as a curved rod-shaped member that extend in the −Z direction are installed on the −Z-direction side of the horizontal member 13b. The third rod 21 is rotatably installed with a rotation axis 21a along the Z direction as a rotation center. Similarly, the fourth rod 22 is also rotatably installed with a rotation axis 22a along the Z direction as a rotation center. The rotation axis 21a and the rotation axis 22a are orthogonal to the position change directions 9d. Accordingly, a virtual plane 19b including the rotation axis 21a and the rotation axis 22a is orthogonal to the position change directions 9d. On the Z-direction side of the horizontal member 13b, a third biasing portion 23 as a biasing portion is installed in a place that faces the third rod 21, and a fourth biasing portion 24 as a biasing portion is installed in a place that faces the fourth rod 22.

The third biasing portion 23 is connected to the third rod 21, and generates a torque according to an angle at which the third rod 21 rotates. Similarly, the fourth biasing portion 24 is connected to the fourth rod 22, and generates a torque according to an angle at which the fourth rod 22 rotates. The third rod 21 and the fourth rod 22 are biased in predetermined rotational directions by the third biasing portion 23 and the fourth biasing portion 24.

The third rod 21 has two circular-arc portions 21b and has a shape that is curved in the shape of a bow or substantially in the shape of a bow. Both ends of the third rod 21 are made linear and are arranged along the rotation axis 21a. The rotation axis 20a has a virtual shape corresponding to a bowstring with respect to the bow shape of the third rod 21. A portion between the two circular-arc portions 21b is a place farthest from the rotation axis 21a, and this portion is referred to as a protruding portion 21c. Similarly, the fourth rod 22 has two circular-arc portions 22b and has a shape that is curved in the shape of a bow or substantially in the shape of a bow. Both ends of the fourth rod 22 are made linear and are arranged along the rotation axis 22a. The rotation axis 21a has a virtual shape corresponding to a bowstring with respect to the bow shape of the fourth rod 22. A portion between the two circular-arc portions 22b is a place farthest from the rotation axis 22a, and this portion is referred to as a protruding portion 22c.

A second tip portion 25 as a tip portion is installed at the ends of the third rod 21 and the fourth rod 22 on the −Z-direction side. The third rod 21 and the fourth rod 22 are rotatably installed with respect to the second tip portion 25. The third rod 21 is rotatably supported on the horizontal member 13b and the second tip portion 25. Similarly, the fourth rod 22 is rotatably supported on the horizontal member 13b and the second tip portion 25. The horizontal member 13b, the second tip portion 25, the rotation axis 21a, and the rotation axis 22a are formed in an oblong shape. Accordingly, even if the third rod 21 rotates around the rotation axis 21a and the fourth rod 22 rotates around the rotation axis 22a, the relative position of the horizontal member 13b and the second tip portion 25 does not change.

The linear portion of the first rod 14 inserted into the horizontal member 12b is referred to as a linear portion 14e. The portion of the first rod 14 located between the horizontal member 12b and the first tip portion 20 is referred to as a curved portion 14f. The rotation axis 14a intersects the horizontal member 12b and the first tip portion 20. The linear portion 14e extends along the rotation axis 14a, and the curved portion 14f is apart from the rotation axis 14a. Similarly, the linear portion of the second rod 15 inserted into the horizontal member 12b is referred to as a linear portion 15e. The portion of the second rod 15 located between the horizontal member 12b and the first tip portion 20 is referred to as a curved portion 15f. The rotation axis 15a intersects the horizontal member 12b and the first tip portion 20. The linear portion 15e extends along the rotation axis 15a, and the curved portion 15f is apart from the rotation axis 15a.

The linear portion of the third rod 21 inserted into the horizontal member 13b is referred to as a linear portion 21e. The portion of the third rod 21 located between the horizontal member 13b and the second tip portion 25 is referred to as a curved portion 21f. The rotation axis 21a intersects the horizontal member 13b and the second tip portion 25. The linear portion 21e extends along the rotation axis 21a, and the curved portion 21f is apart from the rotation axis 21a. Similarly, the linear portion of the fourth rod 22 inserted into the horizontal member 13b is referred to as a linear portion 22e. The portion of the fourth rod 22 located between the horizontal member 13b and the second tip portion 25 is referred to as a curved portion 22f. The rotation axis 22a intersects the horizontal member 13b and the second tip portion 25. The linear portion 22e extends along the rotation axis 22a, and the curved portion 22f is apart from the rotation axis 22a.

The position changing unit 9 narrows the interval between the first stage 9b and the second stage 9c. At this time, the first rod 14 and the second rod 15 support a −X-direction side of the object 2 to be pinched, and the third rod 21 and the fourth rod 22 support an X-direction side of the object 2 to be pinched. Also, the first tip portion 20 and the second tip portion 25 support and hold a bottom surface of the object 2 to be pinched.

A control unit 26 is installed on a Y-direction side of the robot hand 4 in the drawing. The control unit 26 is a device that performs the control of the arm 5 and the control of the robot hand 4. The control unit 26 makes the first stage 9b and the second stage 9c move so as to change the interval between the first holding unit 10 and the second holding unit 11.

The materials of the first base 12, the second base 13, the first tip portion 20, the second tip portion 25, the first rod 14, the second rod 15, the third rod 21, and the fourth rod 22 may be materials having rigidity capable of withstanding cleaning and disinfection and are not particularly limited. Metal, silicone resin, or the like can be used. In the present embodiment, for example, stainless steel is adopted as the material of the first base 12, the second base 13, the first tip portion 20, the second tip portion 25, the first rod 14, the second rod 15, the third rod 21, and the fourth rod 22. In addition, for example, a method in which a method of immersing in a cleaning liquid and ultrasonically cleaning and mechanical cleaning, such as brushing, are combined can be used as the cleaning method. Sterilization by boiling, chlorination, or the like, for example, can be performed for the disinfection.

As shown in FIG. 1A, when the robot hand 4 does not hold the object 2 to be pinched, the first rod 14 and the second rod 15 are arranged along the same plane, and the third rod 21 and the fourth rod 22 are arranged along the same plane. As shown in FIG. 1B, when the first base 12 and the second base 13 approach each other, the first rod 14 to the fourth rod 22 come into contact with the object 2 to be pinched. Also, since the first rod 14 to the fourth rod 22 are curved in the shape of a bow, the first rod 14 to the fourth rod 22 rotate, and the first tip portion 20 and the second tip portion 25 are located further toward the center side than the outer peripheries of the object 2 to be pinched in the ±X directions.

As shown in FIG. 2A, the first base 12 and the second base 13 further approach each other. The first rod 14 and the second rod 15 protrude to the −X side, the third rod 21 and the fourth rod 22 protrude to the X side. Then, the first tip portion 20 and the second tip portion 25 are located further toward the center side than the outer periphery of the object 2 to be pinched in the X direction.

Figure 3A:
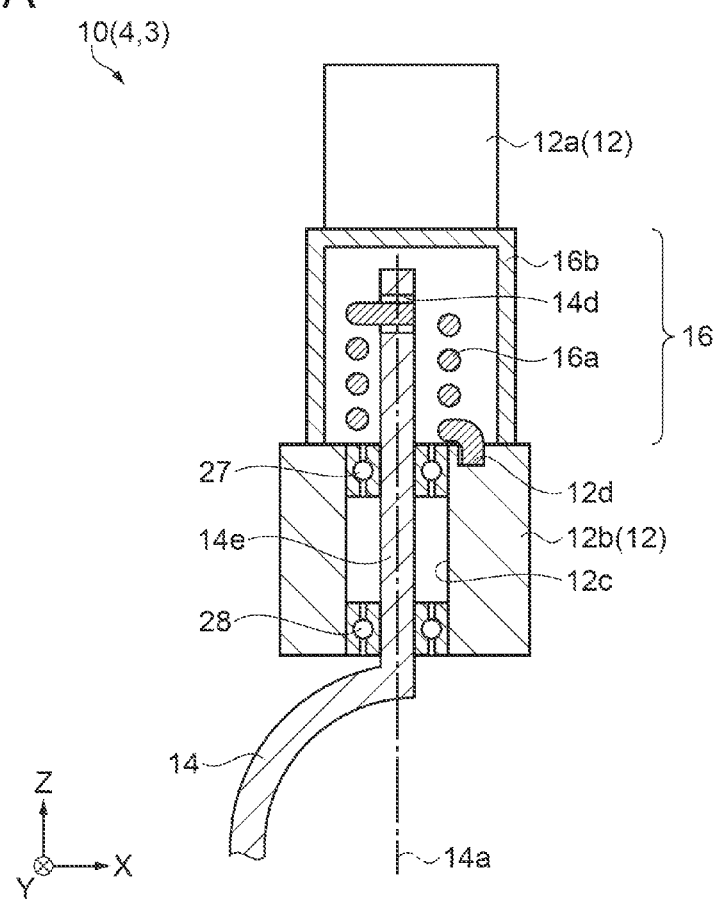
FIG. 3A is a schematic cross-sectional view of portions showing a first biasing portion and a base.

FIG. 3A is a schematic cross-sectional view of portions showing the first biasing portion and the base. As shown in FIG. 3A, a through hole 12c is bored in the horizontal member 12b, and the linear portion 14e of the first rod 14 is inserted into the through hole 12c. A first bearing 27 as a bearing and a second bearing 28 as a bearing are installed in the through hole 12c, and the first bearing 27 and the second bearing 28 rotatably support the first rod 14. The first bearing 27 and the second bearing 28 support the first rod 14 in two places. As a result, the first bearing 27 and the second bearing 28 can keep the linear portion 14e of the first rod 14 from inclining with respect to the rotation axis 14a and can rotate the first rod 14 with high precision with the rotation axis 14a as a rotation center.

The first bearing 27 and the second bearing 28 only have to be capable of rotating the first rod 14 with a low frictional resistance, and the types of the first bearing 27 and the second bearing 28 are not particularly limited. As the types of the first bearing 27 and the second bearing 28, for example, rolling bearings, such as a ball bearing and a roller bearing, or sliding bearings using engineering plastic, bearing metal, ceramics, or the like can be used. In the present embodiment, the ball bearing that is one of the rolling bearings is used.

The first rod 14 protrudes through the horizontal member 12b. A through hole 14d that penetrates in a radial direction of the first rod 14 is formed near an end of the first rod 14. The first biasing portion 16 includes a coil spring 16a as a spring, and an end of the coil spring 16a is inserted into the through hole 14d. A recess 12d is formed in an upper surface of the horizontal member 12b, and an end of the coil spring 16a is inserted into the recess 12d. When the first rod 14 rotates around the rotation axis 14a, a torque is applied to the first rod 14 by the coil spring 16a.

A cover 16b is installed so as to cover the coil spring 16a. The cover 16b protects the coil spring 16a so that matter separated from the object 2 to be pinched does not adhere to the coil spring 16a. In addition, a structure in which the second rod 15 is installed at the horizontal member 12b is the same as a structure in which the first rod 14 is installed at the horizontal member 12b, and the description thereof is omitted. Similarly, a structure in which the third rod 21 and the fourth rod 22 are installed at the horizontal member 13b is the same as the structure in which the first rod 14 is installed at the horizontal member 12b, and the description thereof is omitted. The internal structure of the second biasing portion 17, the third biasing portion 23, and the fourth biasing portion 24 is the same as the internal structure of the first biasing portion 16, and the description thereof is omitted.

Figure 3B:
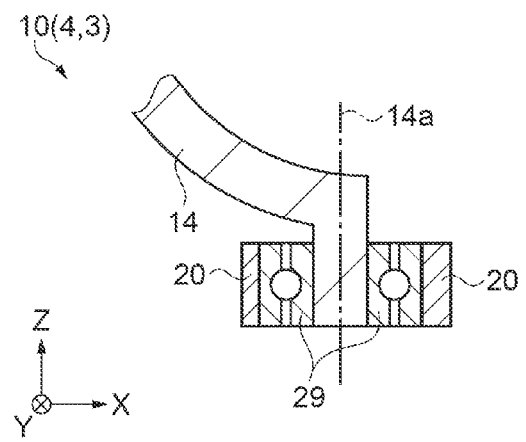
FIG. 3B is a schematic cross-sectional view of portions showing the connection structure between a first rod and a first tip portion.

FIG. 3B is a schematic cross-sectional view of portions showing the connection structure between the first rod and the first tip portion. As shown in FIG. 3B, the end of the first rod 14 on the −Z direction side has a linear shape along the rotation axis 14a. Also, the end of the first rod 14 is installed at the first tip portion 20 via a third bearing 29. Accordingly, the first rod 14 is made rotatable with low frictional resistance with respect to the first tip portion 20.

The type of the third bearing 29 is not particularly limited, and the same bearing as the first bearing 27 can be used. In addition, a structure in which the second rod 15 is installed at the first tip portion 20 is the same as the structure in which the first rod 14 is installed at the first tip portion 20, and the description thereof is omitted. Similarly, a structure in which the third rod 21 and the fourth rod 22 are installed at the second tip portion 25 is the same as the structure in which the first rod 14 is installed in the first tip portion 20, and the description thereof is omitted.

Figure 4A:
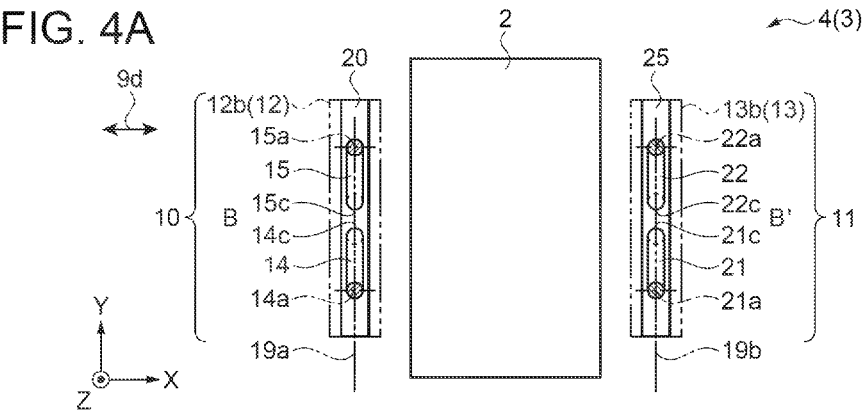
FIGS. 4A to 4C are schematic views for describing the operation of a first rod to a fourth rod.

FIGS. 4A to 5D are schematic views for describing the operation of the first rod to the fourth rod. FIGS. 4A to 5B are views when viewed from line B-B' of FIG. 2B. FIG. 4A shows a state where the robot hand 4 does not hold the object 2 to be pinched. FIGS. 4B to 5A show progress until the robot hand 4 holds the object 2 to be pinched. FIG. 5B shows a state where the robot hand 4 holds the object 2 to be pinched. FIGS. 5C and 5D are views when the first rod 14 is viewed from the Z-direction side of the horizontal member 12b. FIG. 5C shows a state where the robot hand 4 does not hold the object 2 to be pinched, and FIG. 5D shows a state where the robot hand 4 holds the object 2 to be pinched. In addition, in order to make the drawing easily seen, the surface of the cover 16b on the Z-direction side is omitted in FIGS. 5C and 5D.

As shown in FIG. 4A, when the robot hand 4 does not hold the object 2 to be pinched, the interval between the first tip portion 20 and the second tip portion 25 in the X direction is longer than the width of the object 2 to be pinched. Then, the protruding portion 14c of the first rod 14 and the protruding portion 15c of the second rod 15 approach each other and protrude toward the longitudinal direction of the first tip portion 20. As a result, the first rod 14 and the second rod 15 overlap the first tip portion 20 so as to follow the same or substantially same virtual plane 19a when viewed from the Z direction. The first rod 14 and the second rod 15 are adapted so as not to protrude in the X direction of the first tip portion 20. Similarly, the protruding portion 21c of the third rod 21 and the protruding portion 22c of the fourth rod 22 approach each other and protrude toward the longitudinal direction of the second tip portion 25. As a result, the third rod 21 and the fourth rod 22 overlap the second tip portion 25 so as to follow the same or substantially same virtual plane 19b when viewed from the Z direction. The third rod 21 and the fourth rod 22 are adapted so as not to protrude in the X direction of the second tip portion 25. This enables the first holding unit 10 and the second holding unit 11 to be inserted into the narrow gaps.

Figure 4B:
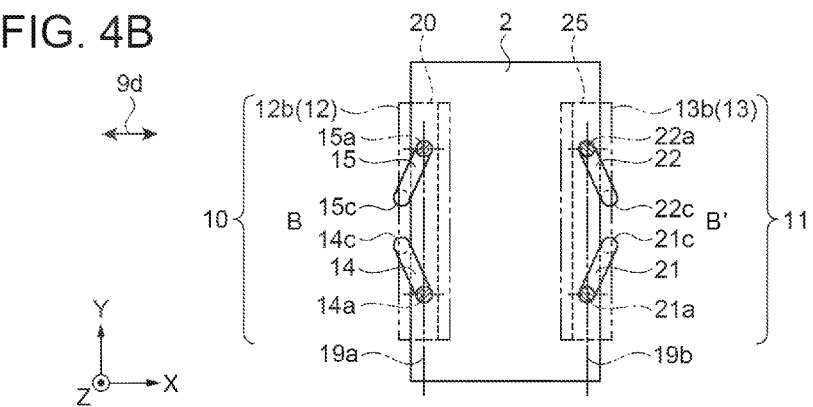

As shown in FIG. 4B, the position changing unit 9 moves the first base 12 and the second base 13 to narrow the intervals between the first rod 14, the second rod 15, the third rod 21, and the fourth rod 22. As a result, in the first rod 14, the protruding portion 14c is pressed against the object 2 to be pinched and rotates around the rotation axis 14a. Similarly, the second rod 15, the third rod 21, and the fourth rod 22 rotate around the rotation axis 15a, the rotation axis 21a, and the rotation axis 22a, respectively. The first rod 14 and the second rod 15 move away from the virtual plane 19a, and the third rod 21 and the fourth rod 22 move away from the virtual plane 19b. Then, the first tip portion 20 and the second tip portion 25 move toward the center of the object 2 to be pinched when viewed from the Z direction.

Figure 4C:
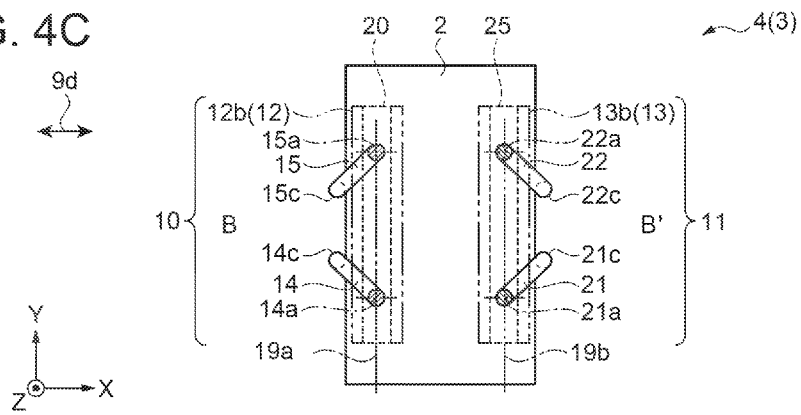

As shown in FIGS. 4C and 5A, the position changing unit 9 further moves the first base 12 and the second base 13 to narrow the intervals between the first rod 14, the second rod 15, the third rod 21, and the fourth rod 22. As a result, the protruding portion 14c is pressed against the object 2 to be pinched and the first rod 14 rotates around the rotation axis 14a. Similarly, the second rod 15, the third rod 21, and the fourth rod 22 rotate around the rotation axis 15a, the rotation axis 21a, and the rotation axis 22a, respectively. Then, the first tip portion 20 and the second tip portion 25 move toward the center of the object 2 to be pinched when viewed from the Z direction.

As shown in FIG. 5B, the position changing unit 9 further moves the first base 12 and the second base 13 to narrow the intervals between the first rod 14, the second rod 15, the third rod 21, and the fourth rod 22. Then, the protruding portion 14c of the first rod 14 and the protruding portion 15c of the second rod 15 are pressed against the object 2 to be pinched and protrude toward a direction away from the horizontal member 12b. The first tip portion 20 enters the bottom of the object 2 to be pinched when viewed from the Z direction.

Similarly, the protruding portion 21c of the third rod 21 and the protruding portion 22c of the fourth rod 22 are also pressed against the object 2 to be pinched and protrude toward a direction away from the horizontal member 13b. The second tip portion 25 enters the bottom of the object 2 to be pinched when viewed from the Z direction. As a result, since the interval between the first tip portion 20 and the second tip portion 25 becomes shorter than the width of the object 2 to be pinched, it is possible to support the bottom of the object 2 to be pinched at the first tip portion 20 and the second tip portion 25.

Next, when the robot hand 4 releases the object 2 to be pinched, the position changing unit 9 moves the first base 12 and the second base 13 to widen the interval between the first base 12 and the second base 13. At this time, the first rod 14, the second rod 15, the third rod 21, and the fourth rod 22 rotate in order of the drawings shown in FIG. 5B, FIG. 5A, FIG. 4C, FIG. 4B, and FIG. 4A.

As a result, as shown in FIG. 4A, the first tip portion 20 and the second tip portion 25 move away from the object 2 to be pinched when viewed from the Z direction. The protruding portion 14c of the first rod 14 and the protruding portion 15c of the second rod 15 approach each other and protrude toward the longitudinal direction of the first tip portion 20. The first rod 14 and the second rod 15 overlap the first tip portion 20 so as to follow the same or substantially same plane when viewed from the Z direction. Similarly, the protruding portion 21c of the third rod 21 and the protruding portion 22c of the fourth rod 22 approach each other and protrude toward the longitudinal direction of the second tip portion 25. As a result, the third rod 21 and the fourth rod 22 overlap the second tip portion 25 so as to follow the same or substantially same plane when viewed from the Z direction. The third rod 21 and the fourth rod 22 are adapted so as not to protrude in the X direction of the second tip portion 25.

As shown in FIG. 5C, a regulating pin 30 is installed on the surface of the horizontal member 12b on the Z-direction side near the coil spring 16a. The first rod 14 is bent at a right angle in a place near the end thereof on the −Z-direction side. The first rod 14 is biased by the coil spring 16a so as to rotate clockwise in the drawing. Also, when the first rod 14 does not come into contact with the object 2 to be pinched, a side surface near the end of the first rod 14 comes into contact with the regulating pin 30. The first rod 14 is regulated by the regulating pin 30 so as not to rotate. The protruding portion 14c of the first rod 14 is directed to the longitudinal direction of the first tip portion 20 according to this structure.

As shown in FIG. 5D, when the first rod 14 comes into contact with the object 2 to be pinched, the first rod 14 moves away from the regulating pin 30. Then, when the object 2 to be pinched moves in the −X direction in the drawing, the first rod 14 is pushed by the object 2 to be pinched and rotate counterclockwise. When the object 2 to be pinched moves in the X direction, the first rod 14 is biased by the coil spring 16a and rotates clockwise.

The second biasing portion 17, the third biasing portion 23, and the fourth biasing portion 24 have the same structure as the first biasing portion 16. Also, the rotation of the second rod 15, the third rod 21, and the fourth rod 22 is regulated similar to that of the first rod 14. The operation of the respective biasing portions and the respective rods is the same as that of the first biasing portion 16 and the first rod 14, and the detailed description thereof is omitted.

Figure 6:
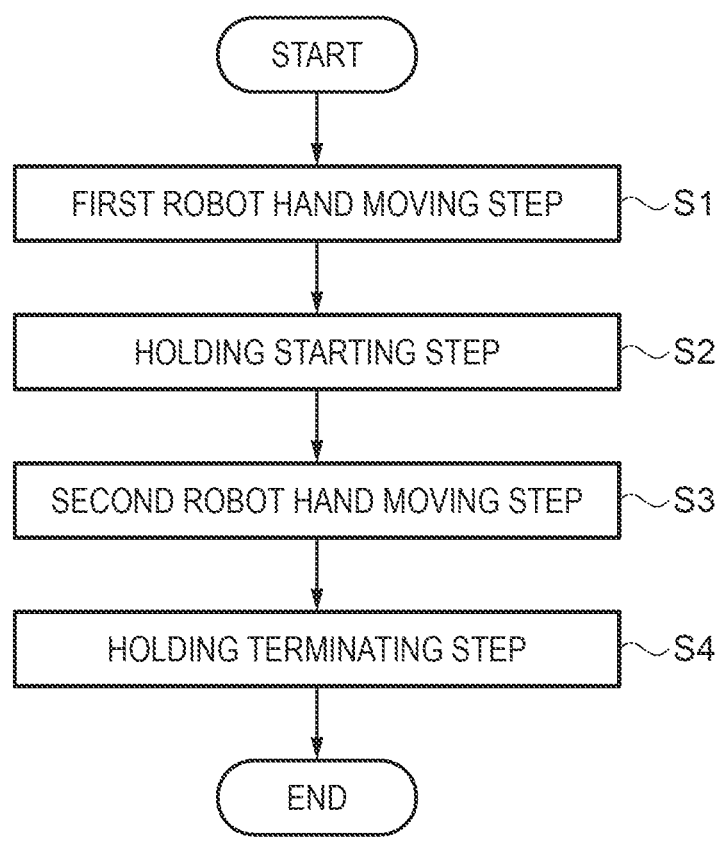
FIG. 6 is a flowchart showing a movement method of an object to be pinched.

Next, a method of holding and moving the object 2 to be pinched by using the above-described robot 3 will be described with reference to FIGS. 6 to 8D. FIG. 6 is a flowchart showing the movement method of the object to be pinched. FIGS. 7A to 8D are schematic views for describing the movement method of the object to be pinched.

In FIG. 6, Step S1 corresponds to a first robot hand moving step. In this step, the first biasing portion 16 to the fourth biasing portion 24 bias the first rod 14 to the fourth rod 22. The first rod 14 and the second rod 15 follow the same or substantially same plane, and the third rod 21 and the fourth rod 22 follow the same or substantially same plane. This Step 1 is also a step of moving the robot hand 4 so that the object 2 to be pinched is located between the first holding unit 10 and the second holding unit 11. Next, the processing proceeds to Step S2. Step S2 corresponds to a holding starting step. In this step, the position changing unit 9 moves the first holding unit 10 and the second holding unit 11. The position changing unit 9 presses the respective rods of the first rod 14 to the fourth rod 22 against the object 2 to be pinched. This Step 2 is also a step of rotating the first rod 14 to the fourth rod 22 with a reaction force from the object 2 to be pinched to hold the object 2 to be pinched so that the first rod 14 to the fourth rod 22 support the object to be pinched. Next, the processing proceeds to Step S3.

Step S3 corresponds to a second robot hand moving step. This step is a step of moving the robot hand 4 holding the object 2 to be pinched. Next, the processing proceeds to Step S4. Step S4 corresponds to a holding terminating step. In this step, the position changing unit 9 moves the first holding unit 10 and the second holding unit 11 to extend the distance between the first holding unit 10 and the second holding unit 11. Also, this Step S4 is a step where the position changing unit 9 spaces the first rod 14 to the fourth rod 22 from the object 2 to be pinched and terminates the holding of the object 2 to be pinched. The step of moving the object 2 to be pinched is terminated in the above process.

Next, the movement method of the object 2 to be pinched so as to correspond to the steps shown in FIG. 6 will be described in detail with reference to FIGS. 7A to 8D. FIGS. 7A and 7B are views corresponding to the first robot hand moving step of Step S1. As shown in FIG. 7A, in Step S1, three objects 2 to be pinched are arranged on the placing table 1. In addition, the placing table 1 and the objects 2 to be pinched in the drawing are partially shown, and a number of objects 2 to be pinched are arranged on the placing table 1. Also, the positional precision of a place where the objects 2 to be pinched are arranged is low, and there occurs a variation in the interval between the objects 2 to be pinched.

The robot hand 4 is moved to a place where the robot 3 faces an object 2 to be pinched. The interval between the first tip portion 20 and the second tip portion 25 is set to be longer than the length of the object 2 to be pinched in the X direction. The interval between the first tip portion 20 and the second tip portion 25 is set to be longer than the length of the object 2 to be pinched in the X direction. Otherwise, an imaging device and an image processor may be provided at the robot 3. The image processor may measure the dimension of the object 2 to be pinched by using an image captured by the imaging device, and the interval between the first tip portion 20 and the second tip portion 25 may be set with reference to the measured dimension. In this method, it is possible to cope with a plurality of types of objects 2 to be pinched.

Next, as shown in FIG. 7B, the robot 3 lowers the robot hand 4 to make the first tip portion 20 and the second tip portion 25 approach the placing table 1. It is preferable that the first tip portion 20 and the second tip portion 25 be made to approach each other so as not to come into contact with the placing table 1. In the case where the first tip portion and the second tip portion do not come into contact with the placing table, the position changing unit 9 can move the first holding unit 10 and the second holding unit 11 with a small force compared to a case where the first tip portion and the second tip portion come into contact with the placing table. However, a claw structure may be provided at the first tip portion 20 and the second tip portion 25. In that case, a claw may be brought into contact with an installation table and be slidingly moved so as to hold the object 2 to be pinched.

Since the first biasing portion 16 to the fourth biasing portion 24 bias the first rod 14 to the fourth rod 22, respectively, the protruding portion 14c of the first rod 14 protrudes in the Y direction, and the protruding portion 15c of the second rod 15 protrudes in a −Y direction. This allows the first rod 14 to the fourth rod 22 to follow the same or substantially same plane. Accordingly, since the width of the first rod 14 and the second rod 15 in the X direction is narrow, the first rod and the second rod are easily inserted into gaps between the adjacent objects 2 to be pinched. The third rod 21 and the fourth rod 22 are also in the same state as the first rod 14 and the second rod 15. Accordingly, the third rod 21 and the fourth rod 22 are easily inserted into gaps between the adjacent objects 2 to be pinched.

FIG. 7C is a view corresponding to the holding starting step of Step S2. As shown in FIG. 7C, in Step S2, the position changing unit 9 makes the first base 12 and the second base 13 approach each other. As a result, in the first holding unit 10, the protruding portion 14c and the protruding portion 15c are pushed by the object 2 to be pinched and protrude in the −X direction. Similarly, in the second holding unit 11, the protruding portion 21c and the protruding portion 22c are pushed by the object 2 to be pinched and protrude in the X direction. Then, the first tip portion 20 and the second tip portion 25 enter between the placing table 1 and the objects 2 to be pinched.

In the robot hand 4, the first tip portion 20 and the second tip portion 25 support the bottom of an object 2 to be pinched, and the first rod 14 to the fourth rod 22 pinch the side surfaces of the object 2 to be pinched. Accordingly, the robot 3 can raise the object 2 to be pinched in a state where the robot hand 4 stably holds the object 2 to be pinched.

Figure 8A:
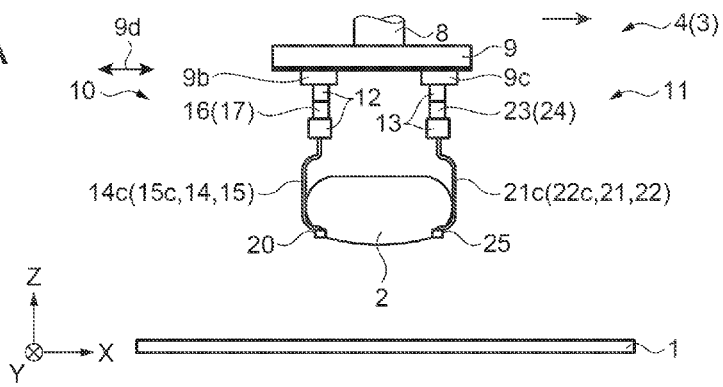
FIGS. 8A to 8D are schematic views for describing the movement method of the object to be pinched.
Figure 8B:
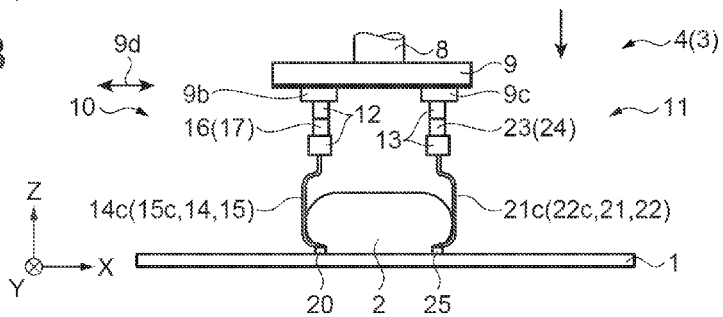

FIGS. 7D to 8B are views corresponding to the second robot hand moving step of Step S3. As shown in FIG. 7D, in Step S3, the robot 3 drives the elevating mechanism 6 to raise the robot hand 4. Next, as shown in FIG. 8A, the robot 3 moves the robot hand 4 and the object 2 to be pinched in the horizontal direction. The robot 3 moves the object 2 to be pinched to a place that faces a movement destination of the object 2 to be pinched. Subsequently, as shown in FIG. 8B, the robot 3 drives the elevating mechanism 6 to lower the robot hand 4. Then, the object 2 to be pinched is placed on the placing table 1 of the movement destination.

Figure 8C:
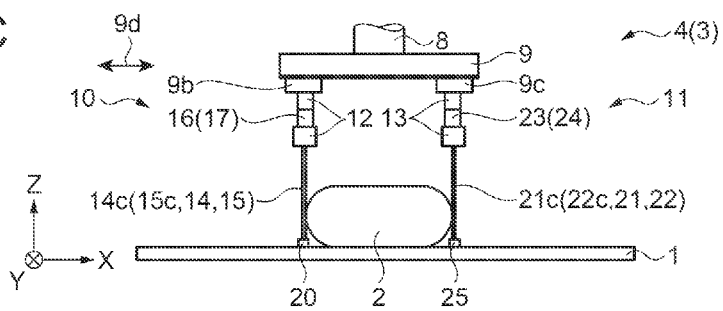
Figure 8D:
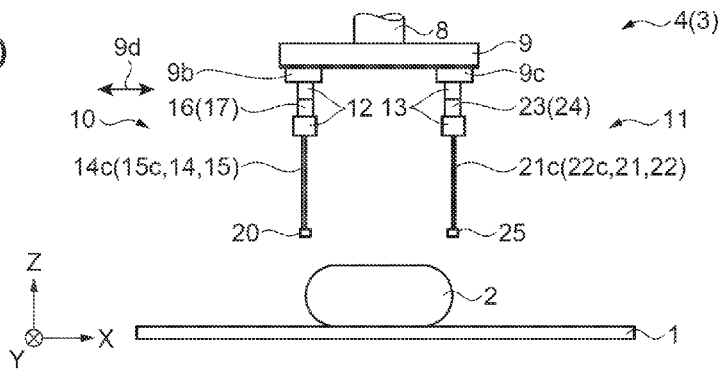

FIGS. 8C to 8D are views corresponding to the holding terminating step of Step S4. As shown in FIG. 8C, the position changing unit 9 moves the first holding unit 10 and the second holding unit 11 to extend the distance between the first holding unit 10 and the second holding unit 11. Then, the position changing unit 9 spaces the first rod 14 to the fourth rod 22 and the object 2 to be pinched apart from each other. Since the first biasing portion 16 to the fourth biasing portion 24 bias the first rod 14 to the fourth rod 22, the protruding portion 14c of the first rod 14 and the protruding portion 21c of the third rod 21 protrude in the Y direction, and the protruding portion 15c of the second rod 15 and the protruding portion 22c of the fourth rod 22 protrude in the −Y direction. As a result, the first rod 14 and the second rod 15 follow the same or substantially same plane, and the third rod 21 and the fourth rod 22 follow the same or substantially same plane.

Next, as shown in FIG. 8D, the robot 3 drives the elevating mechanism 6 to raise the robot hand 4, and stands by. The step of moving the object 2 to be pinched is terminated in the above step.

As described above, according to the present embodiment, the following effects are exhibited.

(1) According to the present embodiment, the first rod 14 and the second rod 15 support the first tip portion 20 in the first holding unit 10, and the third rod 21 and the fourth rod 22 support the second tip portion 25 in the second holding unit 11. As the object 2 to be pinched pushes the first rod 14 to the fourth rod 22, the first rod 14 to the fourth rod 22 rotate. Then, the object 2 to be pinched enters between the first base 12 and the first tip portion 20. The first tip portion 20 is located between the object 2 to be pinched and the placing table 1. Similarly, the object 2 to be pinched enters between the second base 13 and the second tip portion 25. In the second holding unit 11, the second tip portion 25 is located between the object 2 to be pinched and the placing table 1. As a result, since the robot hand 4 supports the bottom of the object 2 to be pinched, the object 2 to be pinched can be stably held.

(2) According to the present embodiment, when the respective holding units do not come into contact with the object 2 to be pinched, the respective biasing portions bias the rods. By virtue of the respective biasing portions, the first rod 14 and the second rod 15 follow the same plane, and the third rod 21 and the fourth rod 22 follow on the same plane. This brings about a form where the respective rods and the respective tip portions are thin. Accordingly, even when the gaps between the adjacent objects 2 to be pinched are narrow, the respective holding units can be inserted into the narrow gaps. Then, as the position changing unit 9 changes the positions of the respective holding units, larger external forces than biasing forces act on the first rod 14 to the fourth rod 22. By virtue of the external forces, the respective rods can rotate and the robot hand 4 can hold the object 2 to be pinched. As a result, even when the gaps between the adjacent objects 2 to be pinched are narrow, the robot hand 4 can stably hold the object 2 to be pinched.

(3) According to the present embodiment, the first rod 14 and the second rod 15 are installed between the horizontal member 12b and the first tip portion 20 in the first holding unit 10, and the third rod 21 and the fourth rod 22 are installed between the horizontal member 13b and the second tip portion 25 in the second holding unit 11. When the position changing unit 9 makes the respective holding units approach the object 2 to be pinched, the respective rods come into contact with the object 2 to be pinched. The first tip portion 20 and the second tip portion 25 are located under the object 2 to be pinched, and the respective rods support the side surfaces of the object 2 to be pinched. As a result, since the robot hand 4 supports the bottom and side surfaces of the object 2 to be pinched, the object 2 to be pinched can be stably held.

(4) According to the present embodiment, the coil spring 16a of the first biasing portion 16 biases the first rod 14. The coil spring 16a can be biased by a force having excellent reproducibility. Accordingly, the first biasing portion 16 can be biased so that the first rod 14 follows the same plane with excellent reproducibility. In addition, this content also has the same effects in the second biasing portion 17, the third biasing portion 23, and the fourth biasing portion 24.

(5) According to the present embodiment, in the first holding unit 10, the horizontal member 12b includes the first bearing 27 and the second bearing 28 that rotatably support the first rod 14. Since the first bearing 27 and the second bearing 28 support the first rod 14 in two places, the robot hand 4 can rotate the first rod 14 with high precision with the rotation axis 14a as a rotation center. In addition, this content also has the same effects in the second rod 15, the third rod 21, and the fourth rod 22. As a result, the first rod 14 to the fourth rod 22 can be stably rotated with a small force.

(6) According to the present embodiment, the first bearing 27, the second bearing 28, and the third bearing 29 are arranged on the rotation axis 14a. Accordingly, the first rod 14 can be rotated with a small force. In addition, this content also has the same effects in the second rod 15, the third rod 21, and the fourth rod 22.

(7) According to the present embodiment, the robot hand 4 holds the object 2 to be pinched so as to be pinched by the first holding unit 10 and the second holding unit 11. Accordingly, when the object 2 to be pinched has an elongated shape, the robot hand 4 can hold the object 2 to be pinched without being limited by the length of the object 2 to be pinched.

Second Embodiment

Next, one embodiment of a robot hand that has features in structure will be described with reference to FIGS. 9A to 10D. The present embodiment is different from the first embodiment in terms of a connection structure between rods and tip portions. In addition, description of the same matters as the first embodiment is omitted.

Figure 9A:
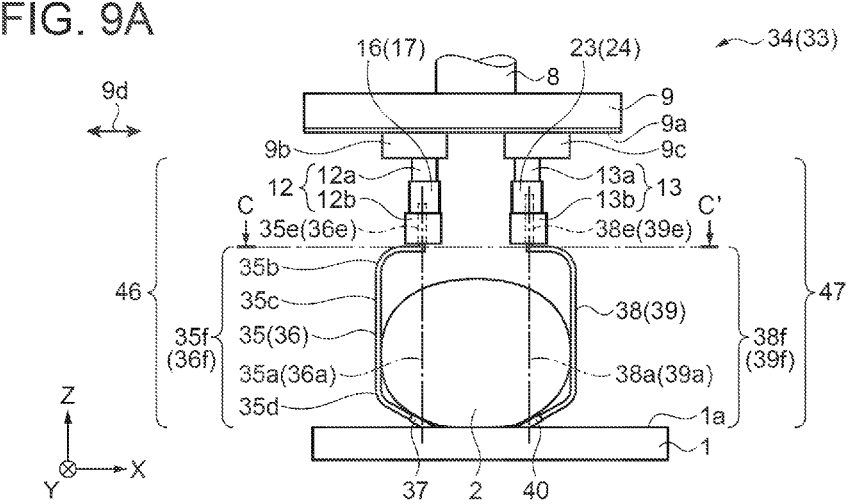
FIGS. 9A to 9C are views related to a second embodiment.
Figure 9B:
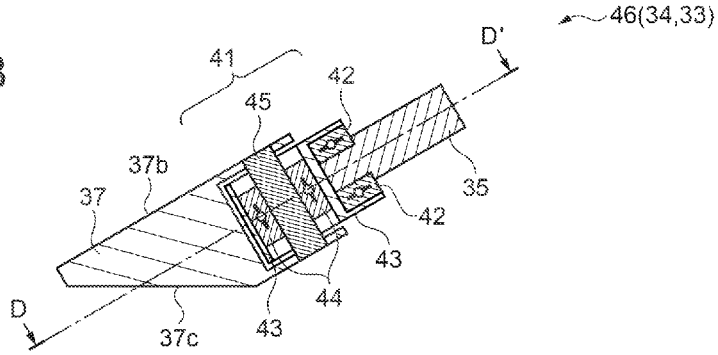
Figure 9C:
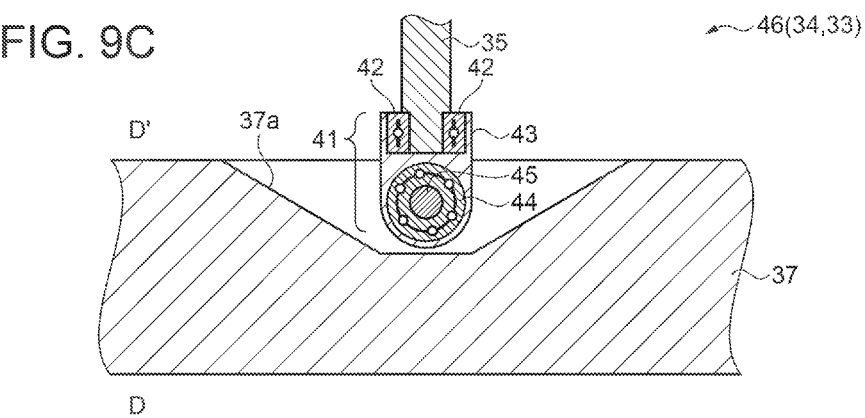

FIG. 9A is a schematic side view showing the structure of the robot hand, and FIGS. 9B and 9C are schematic cross-sectional views of portions showing the structure of the tip portions. That is, in the present embodiment, as shown in FIG. 9A, a robot hand 34 installed at a robot 33 includes the horizontal member 12b, and a first rod 35 as a curved rod-shaped member and a second rod 36 as a curved rod-shaped member are installed on the −Z-direction side of the horizontal member 12b. The first rod 35 rotates around a rotation axis 35a, and the second rod 36 rotates around a rotation axis 36a. The first rod 35 and the second rod 36 have the same shape and are installed at a predetermined interval in the Y direction.

A −Z side of a circular-arc portion 35d of the first rod 35 is made oblique with respect to the rotation axis 35a. In other words, a direction in which a tip of the first rod 35 extends and an axial direction of the rotation axis 35a are intersecting directions. Also, a first tip portion 37 as a tip portion is installed at the ends of the first rod 35 and the second rod 36 on the −Z-direction side. The first rod 35 and the second rod 36 are rotatably installed with respect to the first tip portion 37. The first rod 35 is rotatably supported on the horizontal member 12b and the first tip portion 37. Similarly, the second rod 36 is rotatably supported on the horizontal member 12b and the first tip portion 37. The horizontal member 12b, the first tip portion 37, the rotation axis 35a, and the rotation axis 36a are formed in an oblong shape. Accordingly, even if the first rod 35 rotates around the rotation axis 35a and the second rod 36 rotates around the rotation axis 36a, the relative position of the horizontal member 12b and the first tip portion 37 does not change.

FIGS. 9B and 9C are views showing a portion where the first rod 35 and the first tip portion 37 are connected. FIG. 9C is a cross-sectional view along line D-D' of FIG. 9B. As shown in FIGS. 9B and 9C, the first rod 35 is coupled to the first tip portion 37 via a joint portion 41. The joint portion 41 has a fourth bearing 42. The type of the fourth bearing 42 is not particularly limited, and the same bearing as the first bearing 27 can be used. In the present embodiment, a ball bearing is used for the fourth bearing 42. The first rod 35 is inserted into an inner ring of the fourth bearing 42. A bearing support 43 is installed at an outer ring of the fourth bearing 42.

Both ends of a joint rotating shaft 45 are fixed to the first tip portion 37. Also, an axial direction of the joint rotating shaft 45 and a longitudinal direction of the first tip portion 37 are arranged so as to be orthogonal to each other. A recess 37a is installed in the first tip portion 37, and the joint rotating shaft 45 is installed in the recess 37a. As a result, even if the joint portion 41 rotates around the joint rotating shaft 45, the joint portion 41 is adapted so as not to interfere with the first tip portion 37. The first tip portion 37 has a trapezoidal shape when viewed from the longitudinal direction, and has a thin shape. Also, a tip side of the first tip portion 37 has an acute angle. As a result, the first tip portion 37 easily enters between the placing table 1 and the object 2 to be pinched.

Figure 10A:
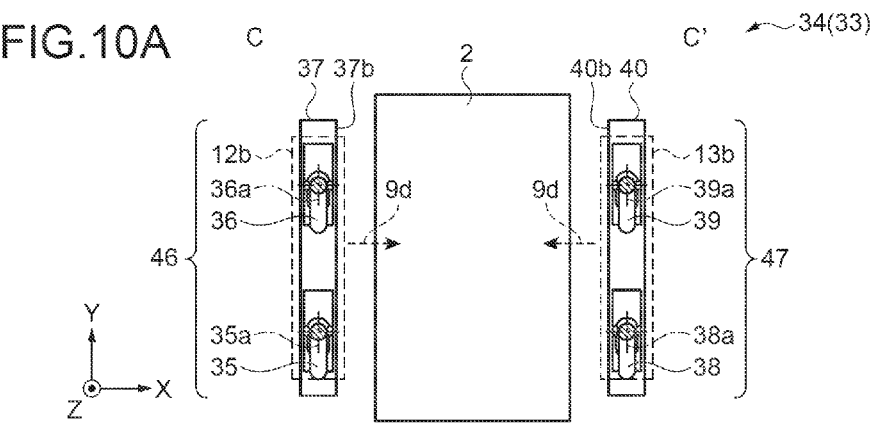
FIGS. 10A to 10D are schematic views for describing the operation of the robot hand.
Figure 10B:
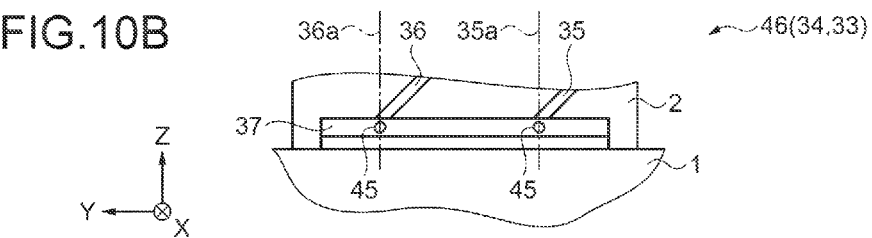
Figure 10C:
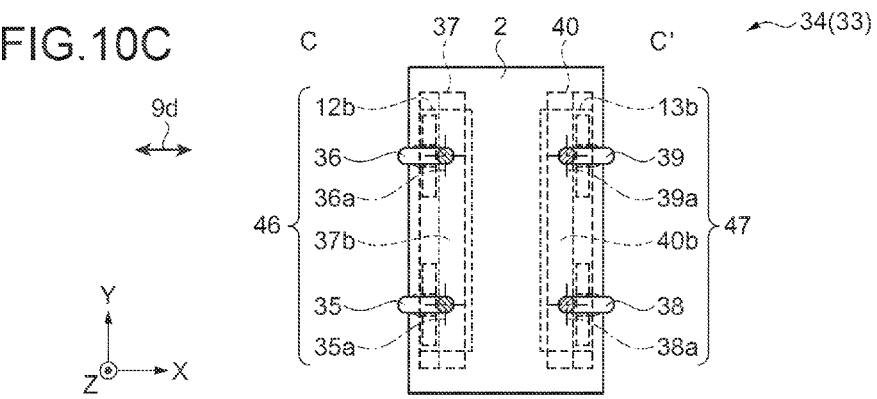
Figure 10D:
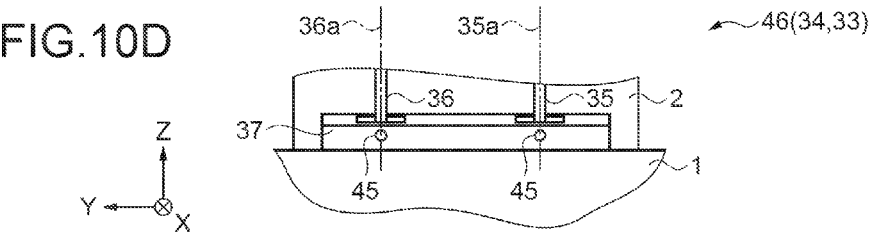

FIGS. 10A to 10D are schematic views for describing the operation of the robot hand, and FIGS. 10A and 10B are views when viewed from line C-C' of FIG. 9A. FIGS. 10B and 10D are side views when the first tip portion 37 is viewed from the −X direction. FIGS. 10A and 10B show a state where the robot hand 34 does not hold the object 2 to be pinched, and FIGS. 10C and 10D show a state where the robot hand 34 holds the object 2 to be pinched.

As shown in FIGS. 10A and 10B, when the robot hand 34 does not hold the object 2 to be pinched, the first biasing portion 16 biases the first rod 35, and the second biasing portion 17 biases the second rod 36. The angle at which the first rod 35 and the second rod 36 rotate is regulated by the regulating pin 30. As a result, the first rod 35 and the second rod 36 overlap the first tip portion 37 when viewed from the Z direction. Also, the first rod 35 protrudes in the −Y direction of the rotation axis 35a, and the second rod 36 protrudes in the −Y direction of the rotation axis 36a. The first rod 35 and the second rod 36 incline from the Z direction toward the −Y direction around the joint rotating shaft 45. In this state, a receiving surface 37b is directed to the X direction, and the first tip portion 37 is made thin without inclining when viewed from the Z direction. Accordingly, even when the intervals between the adjacent objects 2 to be pinched are narrow, the first holding unit 46 and the second holding unit 47 can be inserted between the adjacent objects 2 to be pinched.

As shown in FIGS. 10C and 10D, when the robot hand 34 holds the object 2 to be pinched, the position changing unit 9 makes the horizontal member 12b and the horizontal member 13b approach the object 2 to be pinched. Then, the first rod 35 to the fourth rod 39 are pressed against the object 2 to be pinched. The first rod 35 protrudes to the −X-direction side of the rotation axis 35a, and the second rod 36 also protrudes to the −X-direction side of the rotation axis 36a. Similarly, the third rod 38 protrudes to the X-direction side of the rotation axis 38a, and the fourth rod 39 also protrudes to the X-direction side of the rotation axis 39a.

The first tip portion 37 and the second tip portion 40 enter between the placing table 1 and the object 2 to be pinched. Then, a direction to which the perpendicular line of the receiving surface 37b is directed moves from the X direction toward the Z direction. The direction to which the perpendicular line of a receiving surface 40b is directed moves from the −X direction toward the Z direction.

As described above, according to the present embodiment, the following effects are exhibited.

(1) According to the present embodiment, when the position changing unit 9 makes the horizontal member 12b and the horizontal member 13b approach each other, the direction to which the perpendicular line of the receiving surface 37b is directed moves from the X direction toward the Z direction. The first tip portion 37 is a thin member. Moreover, an external surface 37c of the first tip portion 37 moves so as to be directed to the placing table 1. Accordingly, the first tip portion 37 can be easily made to enter between the placing table 1 and the object 2 to be pinched.

Also, the first rod 35 and the second rod 36 rotate, and the direction to which the perpendicular line of the receiving surface 37b is directed moves from the X direction toward the Z direction. Similarly, the third rod 38 and the fourth rod 39 rotate, and the direction to which the perpendicular line of the receiving surface 40b is directed moves from the −X direction toward the Z direction. The receiving surface 37b is a broad surface in the first tip portion 37, and the receiving surface 40b is a broad surface in the second tip portion 40. Accordingly, since the receiving surface 37b and the receiving surface 40b receive the bottom of the object 2 to be pinched, the first holding unit 46 and the second holding unit 47 can stably hold the object 2 to be pinched.

(2) According to the present embodiment, the direction in which a portion near the tip of the first rod 35 extends and the axial direction of the rotation axis 35a intersect each other. When the first rod 35 rotates around the rotation axis 35a, the direction to which the tip of the first rod 35 is directed changes. The first tip portion 37 is located in the direction in which the tip of the first rod 35 extends. When the direction to which the tip of the first rod 35 is directed changes, the first rod 35 and the joint rotating shaft 45 rotate in the joint portion 41. Accordingly, the first rod 35 can be rotated so that the first tip portion 37 is not twisted. In addition, this content also has the same effects in the relationship between the second rod 36 and the first tip portion 37. In addition, this content also has the same effects in the relationship between the third rod 38 and the fourth rod 39, and the second tip portion 40.

(3) According to the present embodiment, when the robot hand 34 does not hold the object 2 to be pinched, the first rod 35 and the second rod 36 overlap the first tip portion 37 when viewed from the Z direction. Similarly, the third rod 38 and the fourth rod 39 overlap the second tip portion 40 when viewed from the Z direction. Accordingly, even when the intervals between the adjacent objects 2 to be pinched are narrow, the first holding unit 46 and the second holding unit 47 can be inserted and held between the adjacent objects 2 to be pinched.

Third Embodiment

Next, one embodiment of a robot hand that has features in structure will be described with reference to FIGS. 11A to 11C. The present embodiment is different from the second embodiment in that tip portions are located in places apart from rotation axes. In addition, description of the same matters as the second embodiment is omitted.

Figure 11A:
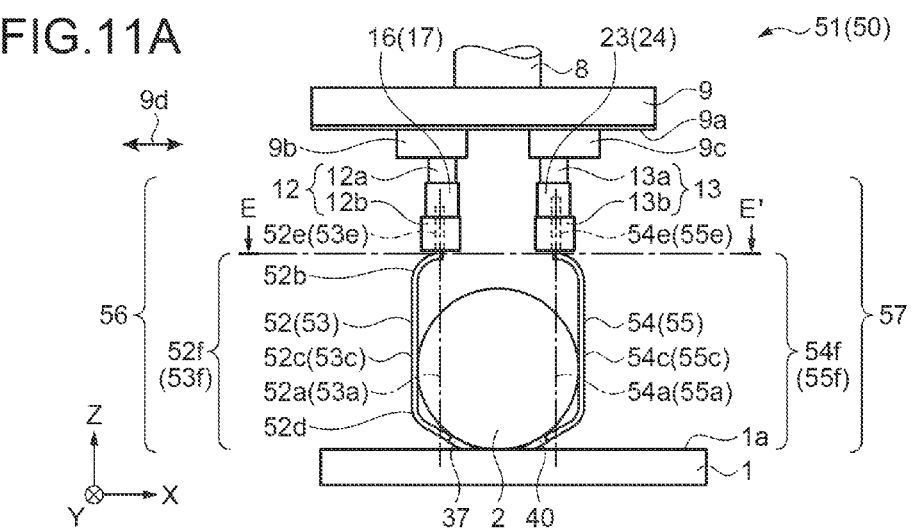
FIGS. 11A to 11C are views related to a third embodiment.

FIG. 11A is a schematic side view showing the structure of the robot hand. FIGS. 11B and 11C are schematic views for describing the operation of the robot hand, and are cross-sectional views along line E-E' of FIG. 11A. That is, in the present embodiment, as shown in FIG. 11A, a robot hand 51 installed at a robot 50 includes the horizontal member 12b, and a first rod 52 as a curved rod-shaped member and a second rod 53 as a curved rod-shaped member are installed on the −Z-direction side of the horizontal member 12b. The first rod 52 rotates around a rotation axis 52a, and the second rod 53 rotates around a rotation axis 53a. The first rod 52 and the second rod 53 have the same shape and are installed at a predetermined interval in the Y direction.

The first tip portion 37 is installed at the tips of the first rod 52 and the second rod 53. The first tip portion 37 is located on the opposite side of a protruding portion 52c with respect to the rotation axis 52a. Similarly, the first tip portion 37 is located on the opposite side of a protruding portion 53c with respect to the rotation axis 53a.

The third rod 54 and the fourth rod 55 are installed at a predetermined interval in the Y direction. Also, the second tip portion 40 is installed at the ends of the third rod 54 and the fourth rod 55 on the −Z-direction side. The second tip portion 40 is apart from a rotation axis 54a and is located on the opposite side of a protruding portion 54c with respect to the rotation axis 54a. Similarly, the second tip portion 40 is apart from a rotation axis 55a and is located on the opposite side of a protruding portion 55c with respect to the rotation axis 55a.

Figure 11B:
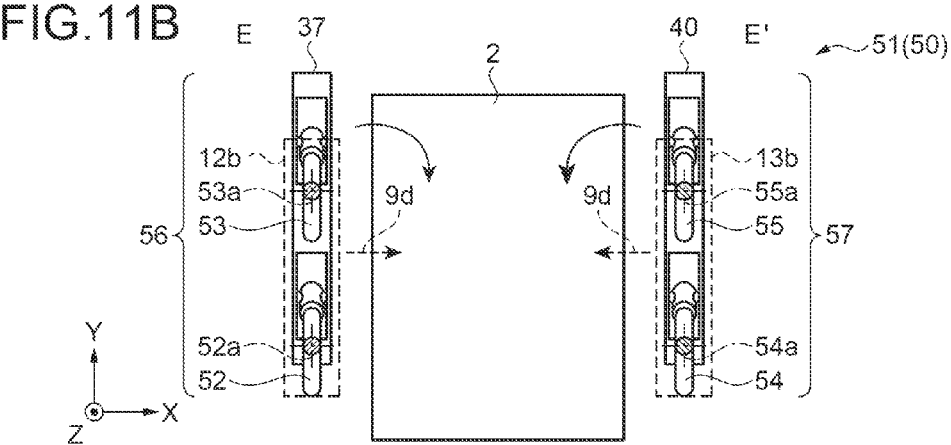

As shown in FIG. 11B, when the robot hand 51 does not hold the object 2 to be pinched, the first biasing portion 16 biases the first rod 52, and the second biasing portion 17 biases the second rod 53. The angles at which the first rod 52 and the second rod 53 rotate are regulated by the regulating pin 30. Also, the first rod 52 protrudes in the −Y direction of the rotation axis 52a, and the second rod 53 protrudes in the −Y direction of the rotation axis 53a. As a result, the first rod 52 and the second rod 53 overlap the first tip portion 37 when viewed from the Z direction. Accordingly, even when the intervals between the adjacent objects 2 to be pinched are narrow, the first holding unit 56 and the second holding unit 57 can be inserted between the adjacent objects 2 to be pinched.

Figure 11C:
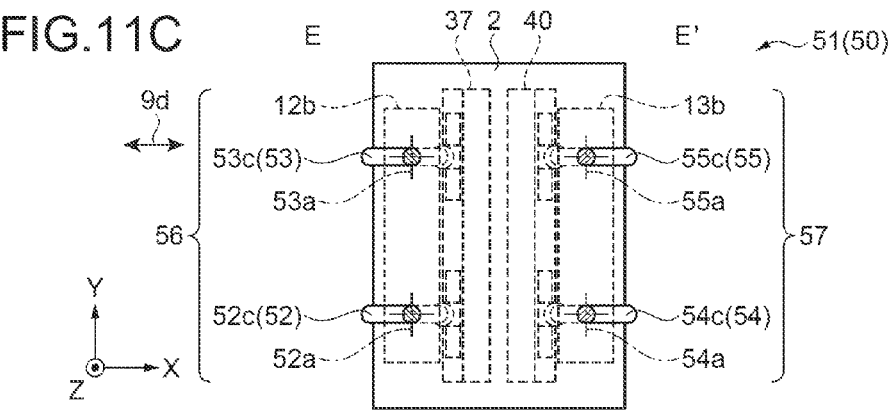

As shown in FIG. 11C, when the robot hand 51 holds the object 2 to be pinched, the position changing unit 9 makes the horizontal member 12b and the horizontal member 13b approach the object 2 to be pinched. Then, the first rod 52 to the fourth rod 55 are pressed against the object 2 to be pinched. The protruding portion 52c of the first rod 52 moves to the −X-direction side of the rotation axis 52a, and the protruding portion 53c of the second rod 53 also moves to the −X-direction side of the rotation axis 53a. Then, the first tip portion 37 moves in parallel and moves to the X-direction side of the rotation axis 52a and the rotation axis 53a.

As described above, according to the present embodiment, the following effects are exhibited.

(1) According to the present embodiment, the robot hand 51 grips the object 2 to be pinched. At this time, the first tip portion 37 moves in parallel and moves to the X-direction side of the rotation axis 52a and the rotation axis 53a. The second tip portion 40 also enters from the rotation axis 54a and the rotation axis 55a to the −X-direction side. As a result, since the first tip portion 37 and the second tip portion 40 enter a place near the center of the object 2 to be pinched and hold the object 2 to be pinched, the object 2 to be pinched can be stably held.

(2) According to the present embodiment, a place where the first rod 52 is connected to the first tip portion 37 is apart from the rotation axis 52a. A place where the second rod 53 is connected to the first tip portion 37 is apart from the rotation axis 53a. Accordingly, the first tip portion 37 can be moved to a place apart from the rotation axis 52a and the rotation axis 53a by rotating the first rod 52 and the second rod 53.

(3) According to the present embodiment, since the first tip portion 37 moves in parallel with the rotation of the first rod 52 and the second rod 53, the interval between the tips of the first rod 52 and the second rod 53 does not change. Since the rods rotate without changing the shape of the first rod 52 and the second rod 53, the first rod 52 and the second rod 53 can be rotated with a small external force.

(4) According to the present embodiment, when the robot hand 51 does not hold the object 2 to be pinched, the first rod 52 and the second rod 53 overlap the first tip portion 37 when viewed from the Z direction. Similarly, the third rod 54 and the fourth rod 55 overlap the second tip portion 40 when viewed from the Z direction. Accordingly, even when the intervals between the adjacent objects 2 to be pinched are narrow, the robot hand 51 can insert between the adjacent objects 2 to be pinched and hold the first holding unit 56 and the second holding unit 57.

Fourth Embodiment

Next, one embodiment of a robot hand that has features in structure will be described with reference to FIGS. 12A and 12B. The present embodiment is different from the first embodiment in that two rods that support the first tip portion 20 intersect each other. In addition, description of the same matters as the first embodiment is omitted.

Figure 12A:
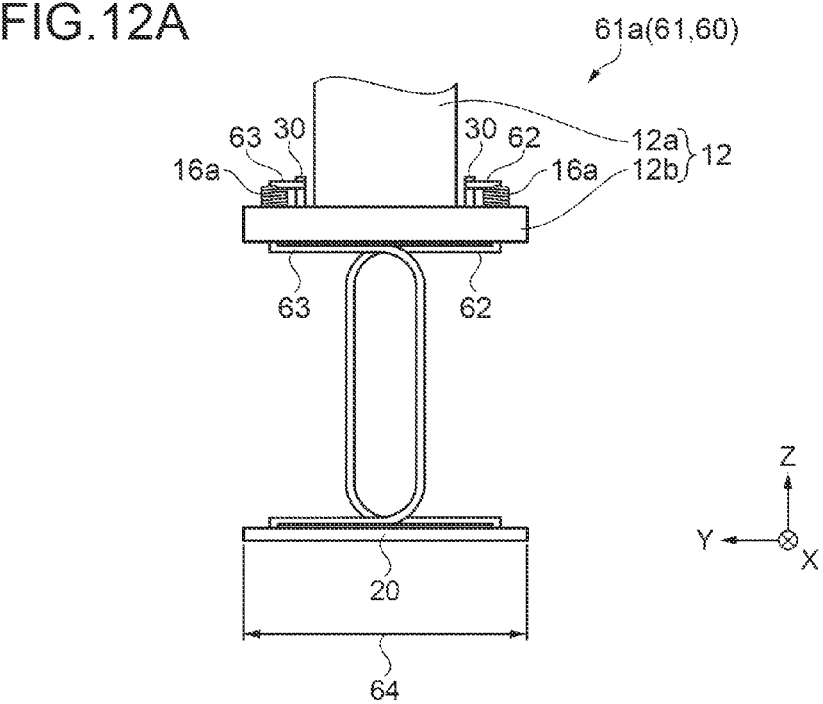
FIGS. 12A to 12B are views related to a fourth embodiment.

FIG. 12A is a schematic side view showing the structure of the robot hand. FIG. 12B is a schematic side view showing the structure of a robot hand in a comparative example. That is, in the present embodiment, as shown in FIG. 12A, a robot hand 61 installed at the robot 60 includes a holding unit 61a, and the holding unit 61a includes the horizontal member 12b.

A first rod 62 as a curved rod-shaped member and a second rod 63 as a curved rod-shaped member are installed on the −Z-direction side of the horizontal member 12b. The regulating pin 30 and the coil spring 16a are installed on the Z-direction side of the horizontal member 12b. When the first rod 62 and the second rod 63 follow the same plane, the first rod 62 and the second rod 63 intersect each other. A holding unit width 64 showing the width of the holding unit 61a at this time becomes the length of the first tip portion 20. In addition, although not shown, the robot hand 61 includes a separate holding unit in a place that faces the holding unit 61a, and a third rod and a fourth rod including this holding unit intersect each other when following the same plane.

Figure 12B:
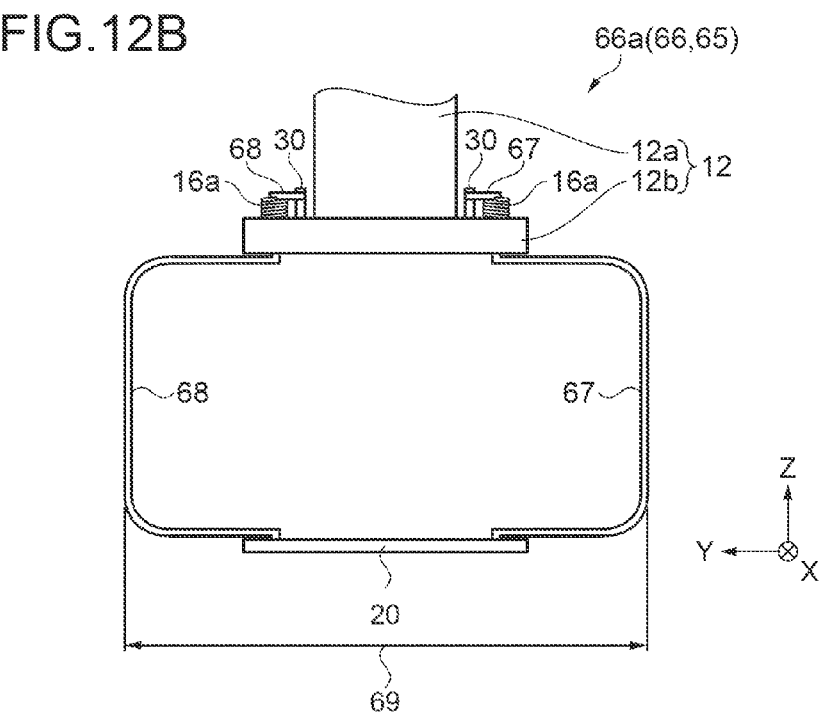

In the form of the comparative example shown in FIG. 12B, a robot hand 66 installed at a robot 65 includes a holding unit 66a, and the holding unit 66a includes the horizontal member 12b. A first rod 67 as a curved rod-shaped member and a second rod 68 as a curved rod-shaped member are installed on the −Z-direction side of the horizontal member 12b. The regulating pin 30 and the coil spring 16a are installed on the Z-direction side of the horizontal member 12b. When the first rod 67 and the second rod 68 follow the same plane, the first rod 67 and the second rod 68 protrude in directions away from each other. A holding unit width 69 showing the width of the holding unit 66a at this time becomes longer than the width of the first tip portion 20. Accordingly, when the first rod 62 and the second rod 63 follow the same plane and when the third rod and the fourth rod follow the same plane, the holding unit width 64 can be shortened by installing the respective rods so as to intersect each other.

As described above, according to the present embodiment, the following effects are exhibited.

(1) According to the present embodiment, when the first rod 62 and the second rod 63 follow the same plane, the first rod 62 and the second rod 63 intersect each other. This can narrow the holding unit width 64. As a result, the robot hand 61 can be easily moved so as not to interfere with the object 2 to be pinched.

Fifth Embodiment

Next, one embodiment of a robot hand that has features in structure will be described with reference to FIGS. 13A and 13B. The present embodiment is different from the first embodiment in that the first tip portion 20 and the second tip portion 25 are omitted. In addition, description of the same matters as the first embodiment is omitted.

Figure 13A:
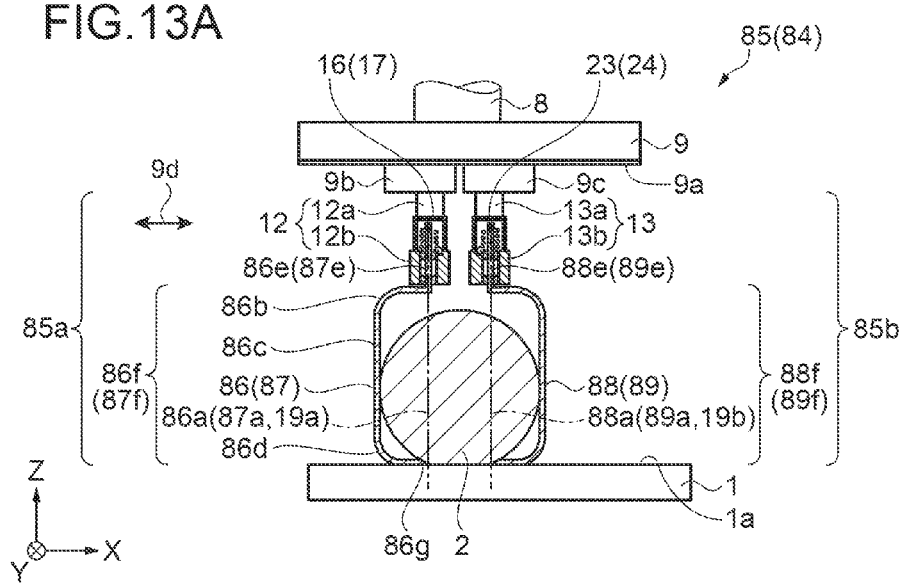
FIGS. 13A and 13B are views related to a fifth embodiment.
Figure 13B:
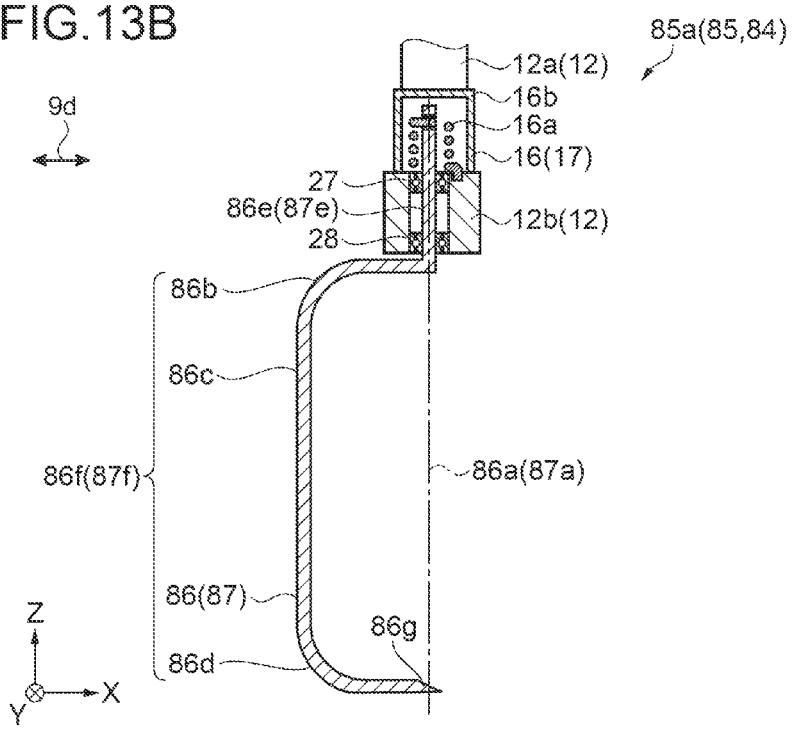

FIG. 13A is a schematic side cross-sectional view showing the structure of the robot hand, and FIG. 13B is a schematic cross-sectional view of portions showing the structure of holding units. That is, in the present embodiment, as shown in FIG. 13A, a robot hand 85 installed at a robot 84 includes a first holding unit 85a and a second holding unit 85b. The first holding unit 85a includes the horizontal member 12b, and a first rod 86 as a curved rod-shaped member and a second rod 87 as a curved rod-shaped member are installed on the −Z-direction side of the horizontal member 12b. The first rod 86 rotates around a rotation axis 86a, and the second rod 87 rotates around a rotation axis 87a. The first rod 86 and the second rod 87 have the same shape and are installed at a predetermined interval in the Y direction.

The end of the first rod 86 on the placing table 1 side is referred to as a first end portion 86g. A portion between a circular-arc portion 86d and the first end portion 86g is formed in parallel with the plane 1a. The first end portion 86g is located on the rotation axis 86a. As a result, even if the first rod 86 rotates around the rotation axis 86a, the relative position of the first base 12 and the first end portion 86g does not change. Also, the first end portion 86g is formed at an acute angle when viewed from the Y-direction side in the drawing. Accordingly, the first end portion 86g easily enters between the placing table 1 and the object 2 to be pinched. In addition, the shape of the second rod 87 is the same shape as the first rod 86 and the description thereof is omitted. The rotation axis 86a and the rotation axis 87a of the second rod 87 are orthogonal to the position change directions 9d. Accordingly, the virtual plane 19a including the rotation axis 86a and the rotation axis 87a is orthogonal to position change directions 9d.

As described above, according to the present embodiment, the following effects are exhibited.

(1) According to the present embodiment, when the robot hand 85 holds the object 2 to be pinched, the object 2 to be pinched enters between a curved portion 86f to a curved portion 89f. The ends of the respective rods enter between the bottom of the object 2 to be pinched and the placing table 1, and the respective rods support the bottom and the side surfaces of the object 2 to be pinched. As a result, the robot hand 85 can support the bottom and side surfaces of the object 2 to be pinched and stably hold the object 2 to be pinched.

(2) According to the present embodiment, when the first holding unit 85a and the second holding unit 85b do not come into contact with the object 2 to be pinched, a place occupied by the first rod 86 and the second rod 87 and a place occupied by the third rod 88 and the fourth rod 89 have thin forms. Accordingly, even when the gaps between the adjacent objects 2 to be pinched are narrow, the first holding unit 85a and the second holding unit 85b can be inserted into the narrow gaps.

(3) According to the present embodiment, since the first tip portion 20 is not installed at the first end portion 86g, the first rod 86 can be easily rotated. Since a structure becomes simple, the robot hand 85 can be easily manufactured.

Sixth Embodiment

Next, one embodiment of a robot hand that has features in a structure will be described with reference to FIGS. 14A and 14B. The present embodiment is different from the first embodiment in that a first film-like member is installed. In addition, description of the same matters as the first embodiment is omitted.

Figure 14A:
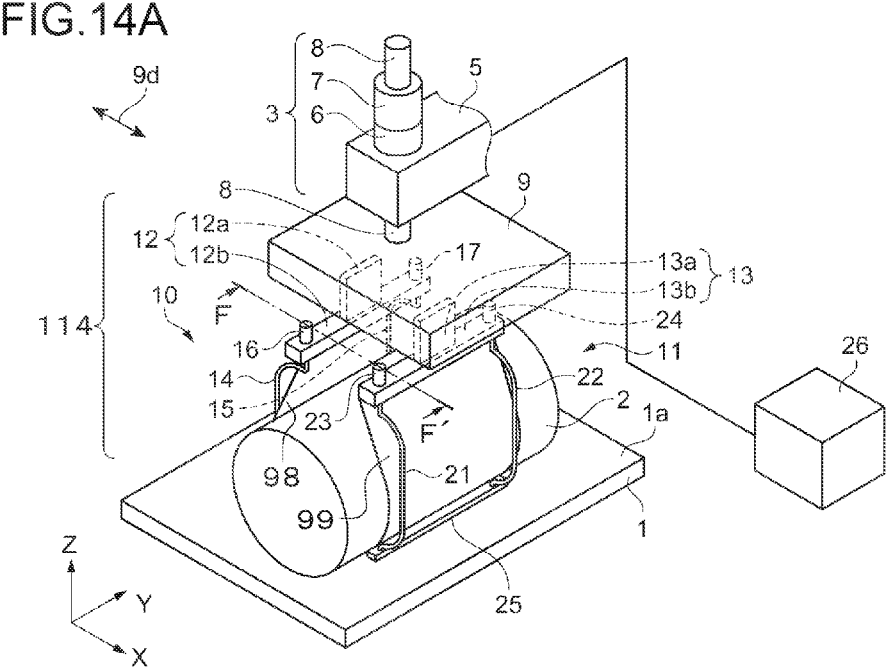
FIGS. 14A and 14B are views related to a sixth embodiment.
Figure 14B:
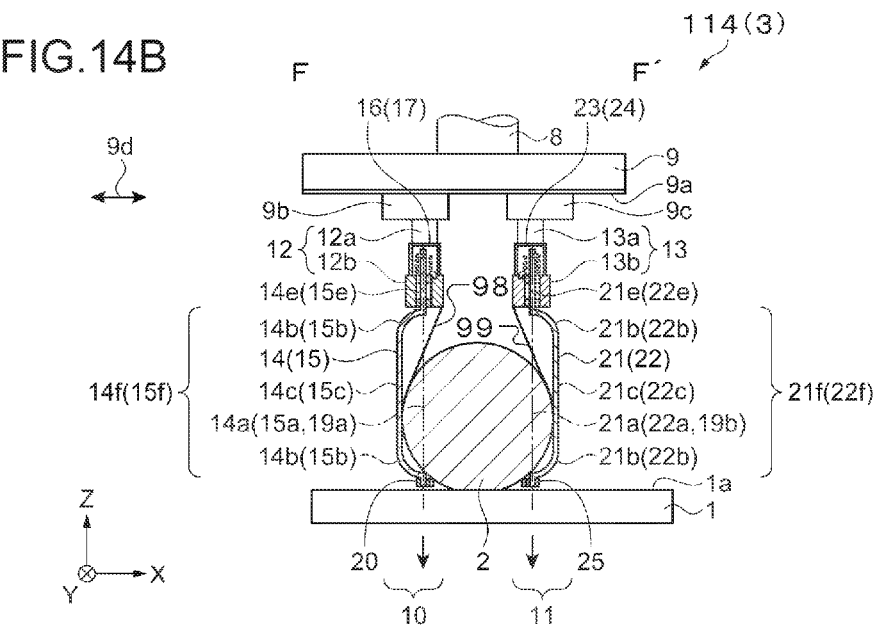

FIG. 14A shows a state where a robot hand holds the object to be pinched. FIG. 14B is a schematic side cross-sectional view showing the configuration of the robot hand. FIG. 14B is a schematic cross-sectional view along line F-F' of FIG. 14A.

A first inner sheet 98 as a first film-like member is installed on the side of the object 2 to be pinched between the horizontal member 12b and the first tip portion 20. The first inner sheet 98 has one end portion fixed to the horizontal member 12b and has the other end portion fixed to the first tip portion 20. Similarly, a second inner sheet 99 as the first film-like member is installed on the side of the object 2 to be pinched between the horizontal member 13b and the second tip portion 25. The second inner sheet 99 has one end portion fixed to the horizontal member 13b and has the other end portion fixed to the second tip portion 25. The materials of the first inner sheet 98 and the second inner sheet 99 are not particularly limited if elastic materials are provided. As the materials of the first inner sheet 98 and the second inner sheet 99, for example, cloth or the like in which synthetic rubber, such as silicon rubber, crude rubber, or stringlike rubber is knit can be used. In the present embodiment, silicon rubber is used as the first inner sheet 98 and the second inner sheet 99.

When the position changing unit 9 narrows the interval between the first stage 9b and the second stage 9c, the first inner sheet 98 and the second inner sheet 99 come into contact with the side surfaces of the object 2 to be pinched and the bottom surface on the side of the side surfaces. Also, the first holding unit 10 and the second holding unit 11 pinch and hold the object 2 to be pinched with portions of the first inner sheet 98 and the second inner sheet 99. As a result, since the interval between a first tip portion 20 and the second tip portion 25 is shorter than the width of the object 2 to be pinched, it is possible to support the object 2 to be pinched with the first tip portion 20, the second tip portion 25, the first inner sheet 98, and the second inner sheet 99.

As described above, according to the present embodiment, the following effects are exhibited.

(1) According to the present embodiment, the first rod 14 and the second rod 15 support the first tip portion 20 in the first holding unit 10, and the third rod 21 and the fourth rod 22 support the second tip portion 25. The object 2 to be pinched pushes the first rod 14 to the fourth rod 22 via the first inner sheet 98 and the second inner sheet 99. The first rod 14 to the fourth rod 22 rotate. Then, the object 2 to be pinched enters between the first base 12 and the first tip portion 20. The first tip portion 20 is located between the object 2 to be pinched and the placing table 1. Similarly, in the second holding unit 11, the second tip portion 25 is located between the object 2 to be pinched and the placing table 1. As a result, since the robot hand 114 supports the bottom of the object 2 to be pinched, the object 2 to be pinched can be stably held.

(2) According to the present embodiment, the first inner sheet 98 is installed between the horizontal member 12b and the first tip portion 20 in the first holding unit 10, and the second inner sheet 99 is installed between the horizontal member 13b and the second tip portion 25 in the second holding unit 11. The respective sheets are located between the object 2 to be pinched and the respective rods. When the position changing unit 9 makes the respective holding units approach the object 2 to be pinched, the respective sheets come into contact with the object 2 to be pinched. The first tip portion 20 and the second tip portion 25 are located under the object 2 to be pinched, and the respective sheets come into contact with the object to be pinched from the bottom of the object 2 to be pinched to the side surfaces thereof. As a result, since the robot hand 114 supports the bottom and side surfaces of the object 2 to be pinched, the object 2 to be pinched can be stably held.

(3) According to the present embodiment, the first biasing portion 16 to the fourth biasing portion 24 bias the respective rods so as to rotate the respective rods. Also, when the first rod 14 to the fourth rod 22 do not come into contact with the object 2 to be pinched, the respective rods follow the same plane by the regulating pin 30 and the respective biasing portions. As a result, the first tip portion 20, the second tip portion 25, the first inner sheet 98, and the second inner sheet 99 supported on the respective rods follow the same plane similar to the respective rods. Also, forms in which portions constituted by the respective rods, the respective tip portions, and the respective sheets are thin are provided in the respective holding units. Accordingly, even when the gaps between the adjacent objects 2 to be pinched are narrow, the respective holding units can be inserted into the narrow gaps. Also, when the position changing unit 9 changes the positions of the respective holding units, the robot hand 114 can hold the object 2 to be pinched. As a result, even when the gaps between the adjacent objects 2 to be pinched are narrow, the robot hand 114 can hold the object 2 to be pinched.

Seventh Embodiment

Figure 15:
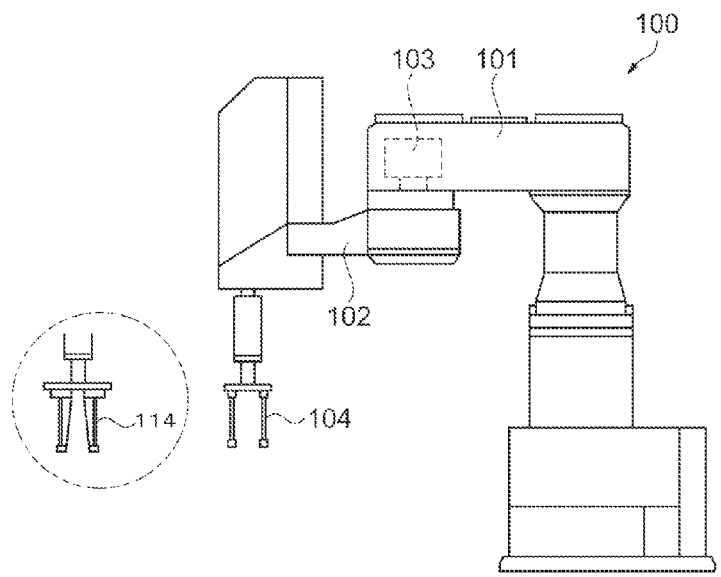
FIG. 15 is a schematic front view showing the structure of a robot related to a seventh embodiment.

Next, a robot including the robot hands of the above embodiments will be described with reference to FIGS. 15 and 16. FIG. 15 is a schematic front view showing the structure of the robot. As shown in FIG. 15, a robot 100 has a first arm 101. Also, a second arm 102 is installed so as to be connected to the first arm 101. A motor 103 is installed at the first arm 101, and an output shaft of the motor 103 is connected to the second arm 102. Also, the motor 103 is driven to thereby rotate the second arm 102 horizontally with respect to the first arm 101. That is, the robot 100 is a scalar robot.

A robot hand 104 is installed at the second arm 102. Any of the robot hands 4, 34, 51, 61, 66, and 85 in the above embodiments is used as the robot hand 104. Otherwise, the robot hands 114 in the above embodiments shown within a circle are used.

Figure 16:
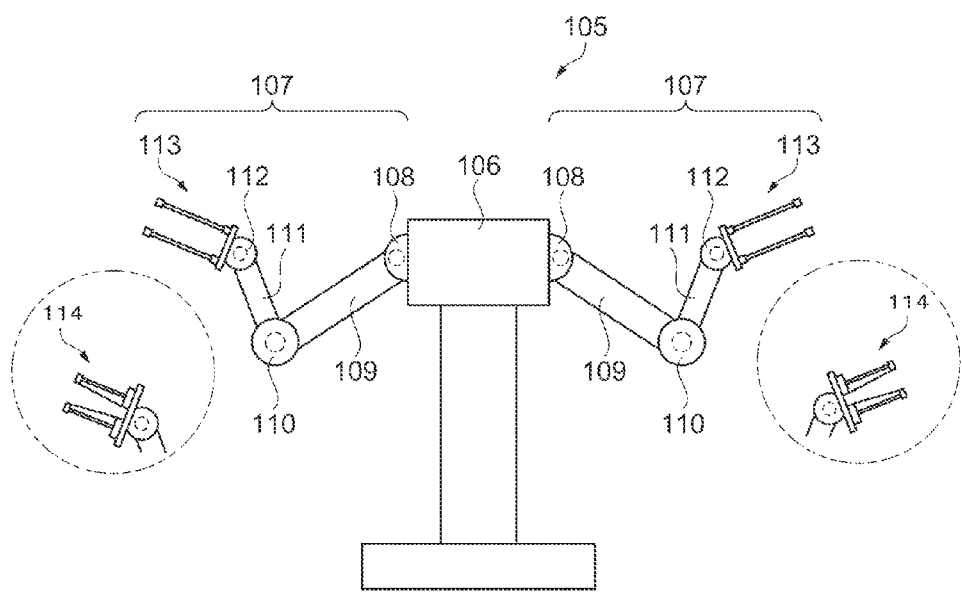
FIG. 16 is a schematic front view showing the structure of a double-arm robot.

FIG. 16 is a schematic front view showing the structure of a double-arm robot. As shown in FIG. 16, the double-arm robot 105 includes a main body portion 106. Also, a pair of arm portions 107 are installed so as to be connected to the main body portion 106. In each arm portion 107, a shoulder joint portion 108, a first link 109, an elbow joint portion 110, a second link 111, a wrist joint portion 112, and a robot hand 113 are installed in this order.

Any of the robot hands 4, 34, 51, 61, 66, and 85 in the above embodiments is used as the robot hand 113. Otherwise, the robot hands 114 in the above embodiments shown within a circle are used.

As described above, according to the present embodiment, the following effects are exhibited.

(1) According to the present embodiment, the robot 100 includes the robot hand 104 and any of the robot hands 4, 34, 51, 61, 66, 85, and 114 in the above embodiments is used as the robot hand 104. Even when the gaps between the adjacent objects 2 to be pinched are narrow, the robot hands in the above embodiments can stably hold the object 2 to be pinched. Accordingly, even when the gaps between the adjacent objects 2 to be pinched are narrow, the robot 100 can be a robot including the robot hand 104 that can stably hold the object 2 to be pinched.

(2) According to the present embodiment, the double-arm robot 105 includes the robot hand 113 and any of the robot hands 4, 34, 51, 61, 66, 85, and 114 in the above embodiments is used as the robot hand 113. Even when the gaps between the adjacent objects 2 to be pinched are narrow, the robot hands in the above embodiments can stably hold the object 2 to be pinched. Accordingly, even when the gaps between the adjacent objects 2 to be pinched are narrow, the double-arm robot 105 can be a robot including the robot hand 113 that can stably hold the object 2 to be pinched.

In addition, the invention is not limited to the above-described embodiments, and those having ordinary knowledge in this field can make various changes or improvements within the technical idea of the invention. Modification examples will be described below.

Modification Example 1

In the first embodiment, the curved portion 14*f* includes the two circular-arc portions 14*b*, and the circular-arc portion 14*b* on the first base 12 side and the circular-arc portion 14*b* on the first tip portion 20 side have the same shape. The shape of the curved portion 14*f* is not limited to this, and the curved portion may have various shapes.

Even in the fifth embodiment, the curved portion 86*f* includes the circular-arc portion 86*b* and the circular-arc portion 86*d*, and the circular-arc portions 86*b* on the first base 12 side and the circular-arc portion 86*d* on the first end portion 86*g* side have the same shape. The shape of the curved portion 86*f* is not limited to this, and the curved portion may have various shapes.

Modification Example 2

In the first embodiment, the rotation axis 14*a*, the rotation axis 15*a*, the rotation axis 21*a*, and the rotation axis 22*a* are parallel to the Z-axis direction. The rotation axes of the rod members may not be parallel to the Z-axis direction, and the plurality of rods may not be parallel to each other.

Modification Example 3

In the fifth embodiment, the rotation axis 86*a*, the rotation axis 87*a*, a rotating axis 88*a*, and a rotating axis 89*a* are parallel to the Z-axis direction. The rotation axes of the rod members may not be parallel to the Z-axis direction, and the plurality of rods may not be parallel to each other.

Modification Example 4

Although the first rod 14 is a round bar in the first embodiment, the cross-sectional shape of the first rod 14 to the fourth rod 22 is not limited to the circle. The cross-sectional shape of the rods may be a triangular shape or a quadrangular shape or may be a polygonal shape or an elliptical shape. The cross-sectional shape may be a plurality of shapes. For example, a portion of the cross-sectional shape may be a round bar and an elliptical shape, or a portion thereof may be a polygonal shape. Also, when the first rod 14 and the second rod 15 follow the same plane, the first rod and the second rod may be thin. Even when the gaps between the adjacent objects 2 to be pinched are narrow, the first holding unit 10 can be easily inserted into the gaps. In addition, this content can be applied not only to the first rod 14 but also to the second rod 15 to the fourth rod 22.

Modification Example 5

In the first embodiment, the coil spring 16*a* is used as the first biasing portion 16. Springs other than the coil spring 16*a* may be used as biasing elements. For example, a leaf spring or a spiral spring around which a leaf spring is wound may be used as the first biasing portion 16. Springs that are easily manufactured may be selected.

Modification Example 6

In the first embodiment, the regulating pin 30 that regulates the rotation of the first rod 14 is installed. When the shape of the coil spring 16*a* can be machined with high precision, the regulating pin 30 may be omitted. Since the number of parts can be reduced, the robot hand 4 can be easily manufactured. In addition, this content can be applied to the second biasing portion 17 to the fourth biasing portion 24.

Modification Example 7

In the first embodiment, the first rod 14 is supported by the two bearings of the first bearing 27 and the second bearing 28.

When the first rod 14 can be stably supported even by at least one bearing, the first rod 14 may be supported only by the first bearing 27. Since the number of parts can be reduced, the robot hand 4 can be easily manufactured. Additionally, when the first rod 14 is intended to be more stably supported, the first rod 14 may be supported by three or more bearings. The first rod 14 can be supported so as not to shake when being rotated. In addition, the contents of Modification Examples 2 to 5 can also be applied to the second embodiment to the sixth embodiment.

Modification Example 8

In the first embodiment, the robot hand 4 includes the two holding units of the first holding unit 10 and the second holding unit 11. The number of holding units that the robot hand includes may be one or may be four or more. The holding units may be installed according to the shapes and characteristics of objects to be pinched. The objects to be pinched can be stably held. In addition, the contents of this modification example can also be applied to the second embodiment to the sixth embodiment.

Modification Example 9

In the second embodiment, the first rod 35 protrudes in the −Y direction of the rotation axis 35a, and the third rod 38 also protrudes in the −Y direction of the rotation axis 38a. The first rod 35 may be made to protrude in the Y direction of the rotation axis 35a, and the third rod 38 may also be made to protrude in the Y direction of the rotation axis 38a. Even in this case, the first tip portion 37 and the second tip portion 40 can be inclined by rotating the first rod 35 to the fourth rod 39.

Modification Example 10

In the fourth embodiment, the first tip portion 20 is installed so as to be connected to the first rod 62 and the second rod 63. The first tip portion 37 described in the second embodiment may be installed so as to be connected to the first rod 62 and the second rod 63. Even in this case, the same effects as the fourth embodiment can be obtained. Additionally, the form in which the first tip portion 20 is omitted may be adopted as shown in the fifth embodiment. Even in this case, the same effects as the fourth embodiment can be obtained.

Modification Example 11

In the first embodiment to the sixth embodiment, the two rods are installed at one holding unit. The number of rods installed at one holding unit may be three or more. If the number of rods is larger, the object 2 to be pinched can be stably held.

Modification Example 12

In the first embodiment, the first holding unit 10 and the second holding unit 11 are installed at the robot hand 4, and the first holding unit 10 and the second holding unit 11 are similar in shape. The plurality of holding units installed at one robot hand may not have similar forms. For example, the first holding unit 10 of the first embodiment and the second holding unit 47 of the second embodiment may be combined. The holding units described in the first embodiment to the sixth embodiment and Modification Example 1 may be combined. Besides, the holding units described in the first embodiment to the sixth embodiment and Modification Example 1, and holding units different from the holding units described in the above embodiments may be combined. Even in this case, the holding units described in the above embodiments can have the effects described above. In addition, this content can also be applied to a robot hand in which three or more holding units are installed.

Modification Example 13

In the first embodiment, the surface of the first rod 14 to the fourth rod 22 may be covered with the flexible member. As the flexible member, an elastic member, such as rubber, or a porous member can be used.

Modification Example 14

In the above seventh embodiment, the robot hand described in the above embodiment is installed at the scalar type robot hand 104 of the robot 100 and the robot hand 113 of the double-arm robot 105. The robot hands described in the above embodiments may be installed at other types of robots. The robot hands described in the above embodiments may be installed at a robot of which the type is a suspended type, a self-traveling robot, a robot having one actuator, a robot having three or more actuators, or the like. Besides, the robot hands described in the above embodiments may be installed at processing machines including a robot hand. Even in this case, the same effects as the above embodiments can be obtained.

Modification Example 15

In the second embodiment, the tip side of the first tip portion 37 has an acute angle. Additionally, in the fifth embodiment, the first end portion 86g is formed at an acute angle. The form of the acute angle is not limited to this and various forms may be adopted. Moreover, the first tip portion 37 or the first end portion 86g may be attachable and detachable.

The entire disclosures of Japanese Patent Application Nos. 2013 042667 filed Mar. 5, 2013 and 2013-042669 filed Mar. 5, 2013 are hereby expressly incorporated by reference herein.

What is claimed is:

1. A robot hand for pinching and holding an object, the robot hand comprising:
   a support; and
   a holding unit coupled to the support, the holding unit including:
      a base; and
      a plurality of non-linear rods rotatably mounted to the base, wherein each of the rods defines a respective rotational axis so as to be rotatable,
   wherein the plurality of rods rotate from a first state that has an entirety of each of said rods being substantially aligned within a plane including a plurality of the rotational axes to a second state that has a part of each of said rods shifted from the plane by a reactionary force imparted from the object due to the holding unit pinching the object, and the rods holding the object along a contact interface of the rods and the object, wherein each of said rods includes:
  a proximal end mounted to the base;
  a distal end at an opposite end of the rod as the proximal end; and
  a protruding portion between the proximal end and the distal end, the protruding portion being radially spaced apart from the proximal and distal ends, and
wherein the protruding portions continuously intersect the rotational axes while the rods rotate between the first and second states.

2. The robot hand according to claim 1,
wherein the rods are U-shaped.

3. The robot hand according to claim 1,
wherein the holding units include biasing members that bias the rods into substantial alignment within the plane.

4. The robot hand according to claim 1,
wherein the plurality of rods overlap each other when in substantial alignment within the plane.

5. A robot comprising:
the robot hand according to claim 1;
a wrist joint connected to the robot hand;
a link connected to the wrist joint;
a main body; and
a shoulder joint coupled to the body and the link.

6. The robot hand according to claim 1,
wherein the support further comprises a position changing unit movably supporting a plurality of the holding units;
wherein the position changing unit narrows an interval between the holding units so that the holding units pinch the object, and
wherein the plurality of rods rotate from the plane, and portions of the rods hold the object while following surfaces of the object.

7. A robot hand for pinching and holding an object, the robot hand comprising:
a support; and
a holding unit coupled to the support, the holding unit including:
  a base; and
  a plurality of non-linear rods rotatably mounted to the base, wherein each of the rods define a respective rotational axis so as to be rotatable, and
tips mounted to distal ends of the plurality of rods,
wherein the plurality of rods rotate from a first state that has an entirety of each of said rods being substantially aligned within a plane including a plurality of the rotational axes to a second state that has a part of each of said rods shifted from the plane by a reactionary force imparted from the object due to the holding unit pinching the object, and at least the tips or the rods holding the object along a contact interface of the tips or rods and the object,
wherein each of the rods includes:
  a proximal end mounted to the base;
  the distal end at an opposite end of the rod as the proximal end;
  and
  a protruding portion between the proximal end and the distal end, the protruding portion being radially spaced apart from the proximal and distal ends, and
wherein the protruding portions continuously intersect the rotational axes while the rods rotate between the first and second states.

8. The robot hand according to claim 7,
wherein the tips continuously intersect the rotation axes while the rods rotate between the first and second states.

9. A robot comprising:
the robot hand according to claim 8;
a wrist joint connected to the robot hand;
a link connected to the wrist joint;
a main body; and
a shoulder joint coupled to the body and the link.

10. The robot hand according to claim 7, further comprising:
a first film that is fixed to the base and the tip portions, and a portion of the first film is located between the object and the rods.

11. A robot comprising:
the robot hand according to claim 10;
a wrist joint connected to the robot hand;
a link connected to the wrist joint;
a main body; and
a shoulder joint coupled to the body and the link.

12. The robot hand according to claim 7,
wherein the rods are U-shaped.

13. The robot hand according to claim 7,
wherein the holding units include biasing members that bias the rods into substantial alignment within the plane.

14. The robot hand according to claim 7,
wherein the plurality of rods overlap each other when in substantial alignment within the plane.

15. The robot hand according to claim 7,
wherein joints pivotably couple the rods to the tips, and the rods and the tips rotate around two axes that intersect each other via the joint portions.

16. The robot hand according to claim 7,
wherein the tips have a trapezoidal shape, and a tip end of the tips have an acute angle, and
wherein the tips are attachable to and detachable from the rods.

17. A robot comprising:
the robot hand according to claim 7;
a wrist joint connected to the robot hand;
a link connected to the wrist joint;
a main body; and
a shoulder joint coupled to the body and the link.

18. A holding method of holding an object with a robot hand of a robot, the holding method comprising:
a first step of moving the robot hand so that the object is located between a plurality of holding units, each of the holding units including a plurality of non-linear members which are rotatable out of substantial alignment within a plane including a plurality of rotation axes of the non-linear members;
a second step of narrowing a relative distance between the plurality of holding units to bring the members into contact with the object and to rotate the members by a reactionary force imparted from the object to the members so that the members support the object;
a third step of moving the robot hand while holding the object; and
a fourth step of moving the holding units to extend the relative distance between the holding units to separate the members and the object from each other to terminate the holding of the object,
wherein each of the members includes:
  a proximal end mounted to a base;
  a distal end at an opposite end of the member as the proximal end; and
  a protruding portion between the proximal end and the distal end, the protruding portion being radially spaced apart from the proximal and distal ends, and wherein the protruding portions continuously intersect the rotational axes while the members rotate between a first state that has an entirety of each of the members being substantially aligned within the plane and a second state that has a part of each of the members shifted from the plane by the reactionary force.

\* \* \* \* \*